United States Patent
Singh et al.

(10) Patent No.: US 12,541,035 B2
(45) Date of Patent: Feb. 3, 2026

(54) RANDOM NOISE ATTENUATION FOR SEISMIC DATA

(71) Applicant: Landmark Graphics Corporation, Houston, TX (US)

(72) Inventors: Satyan Singh, Oxford (GB); Philip Norlund, Houston, TX (US); Adrian Sanchez Rodriguez, Houston, TX (US); Eugene Wolfe, Highlands Ranch, CO (US); Steven Angelovich, Highlands Ranch, CO (US)

(73) Assignee: Landmark Graphics Corporation, Houston, TX (US)

( * ) Notice: Subject to any disclaimer, the term of this patent is extended or adjusted under 35 U.S.C. 154(b) by 403 days.

(21) Appl. No.: 17/527,245

(22) Filed: Nov. 16, 2021

(65) Prior Publication Data

US 2023/0152480 A1 May 18, 2023

(51) Int. Cl.
*G01V 1/36* (2006.01)
*G01V 1/28* (2006.01)

(52) U.S. Cl.
CPC .............. *G01V 1/364* (2013.01); *G01V 1/282* (2013.01); *G01V 2210/324* (2013.01)

(58) Field of Classification Search
CPC .. G01V 1/364; G01V 1/282; G01V 2210/324; G01V 2210/32; G01V 1/366; G01V 1/368
(Continued)

(56) References Cited

U.S. PATENT DOCUMENTS

| 10,785,646 B2 * | 9/2020 | Chakraborty | H04W 12/06 |
| 2016/0070012 A1 * | 3/2016 | Rutten | G01V 1/301 |
| | | | 702/16 |

(Continued)

FOREIGN PATENT DOCUMENTS

| CN | 100349008 C | * | 11/2007 |
| CN | 102364501 A | * | 2/2012 |

(Continued)

OTHER PUBLICATIONS

English translation of CN 102364501, Feb. 29, 2012. (Year: 2012).*

(Continued)

*Primary Examiner* — Michael P Nghiem
(74) *Attorney, Agent, or Firm* — Kilpatrick Townsend & Stockton LLP

(57) ABSTRACT

System and methods of random noise attenuation are provided. A first model may be trained to extract random noise from seismic datasets. A second model may be trained to reconstruct leaked signals from the random noise extracted by the first model. A seismic dataset corresponding to a subsurface reservoir formation and including random noise may be obtained. Using the trained first model, at least a portion of the random noise may be extracted from the first seismic dataset. Using the trained second model, a leaked signal, which includes a portion of the seismic dataset, may be reconstructed from the extracted random noise. A cleaned seismic dataset is generated based on the reconstructed leaked signal and the extracted random noise. The cleaned seismic dataset may include a quantity of random noise that is less than that of the original seismic dataset.

20 Claims, 10 Drawing Sheets

(58) Field of Classification Search
USPC .......................................................... 702/17
See application file for complete search history.

(56) References Cited

U.S. PATENT DOCUMENTS

| | | | | |
|---|---|---|---|---|
| 2017/0076719 | A1* | 3/2017 | Lee | G10L 15/20 |
| 2017/0160414 | A1* | 6/2017 | Sternfels | G01V 1/36 |
| 2019/0120985 | A1* | 4/2019 | Liu | G01V 1/32 |
| 2020/0284937 | A1* | 9/2020 | Zhang | G06N 3/045 |
| 2021/0063591 | A1 | 3/2021 | Hu | |
| 2021/0318458 | A1 | 10/2021 | Baumstein et al. | |
| 2022/0066061 | A1* | 3/2022 | Moldoveanu | G06N 5/022 |
| 2022/0270611 | A1* | 8/2022 | Tuo | G06N 3/08 |
| 2022/0392640 | A1* | 12/2022 | Salahudeen | G01N 33/57415 |
| 2023/0083346 | A1* | 3/2023 | Kulangara Muriyil | G06F 40/279 700/94 |
| 2023/0184620 | A1* | 6/2023 | Batany | G06N 20/00 702/51 |

FOREIGN PATENT DOCUMENTS

| | | | | |
|---|---|---|---|---|
| CN | 102466816 | A * | 5/2012 | |
| CN | 110007347 | A | 7/2019 | |
| CN | 106301755 | B * | 8/2019 | H04L 9/002 |
| CN | 109681789 | B * | 7/2020 | F17D 5/06 |
| CN | 111368710 | A | 7/2020 | |
| CN | 111580162 | A * | 8/2020 | |
| WO | WO 2020/146322 | A1 | 7/2020 | |
| WO | WO 2020/146863 | A1 | 7/2020 | |

OTHER PUBLICATIONS

English translation of CN 109681789, Jul. 3, 2020 (Year: 2020).*
English translation of CN 106301755, Aug. 27, 2019. (Year: 2019).*
English translation of 111580162, Aug. 25, 2020. (Year: 2020).*
English translation of CN 100349008, Nov. 14, 2007. (Year: 2007).*
English translation of CN 102466816, May 23, 2012. (Year: 2012).*
English translation of CN 111580162, Aug. 25, 2020. (Year: 2020).*
Priority document IN 202121036836, Aug. 31, 2021. (Year: 2021).*
Search Report and Written Opinion issued for International Patent Application No. PCT/US2021/059438, dated Aug. 5, 2022, ISR/KR, 11 pages.
Yu et al., "Attention and Hybrid Loss Guided Deep Learning for Consecutively Missing Seismic Data Reconstruction," IEEE Transactions on Geoscience and Remote Sensing, Mar. 30, 2021, vol. 60. No. 5902108, pp. 1-8.
Johnson, et al., Perceptual losses for real-time style transfer and super-resolution, European Conference on Computer Vision, 2016, pp. 694-711.
Qi, Guo-Jun, Loss-Sensitive Generative Adversarial Networks on Lipschitz Densities, International Journal of Computer Vision, 2020, pp. 1118-1140, vol. 128.
Zhao, et al., Swell-noise attenuation: a deep learning approach, The Leading Edge, 2019, pp. 38(12), 934-942.

* cited by examiner

RANDOM NOISE ATTENUATION FOR SEISMIC DATA

FIELD OF THE DISCLOSURE

The present disclosure relates generally to random noise attenuation and particularly, to attenuation of random noise from seismic data of a subsurface reservoir formation.

BACKGROUND

For purposes of hydrocarbon exploration and production, knowing the properties and locations of underground rock formations is useful for making decisions as to where and how to economically produce hydrocarbons from underground reservoirs. Seismic reflection surveys of both onshore and offshore hydrocarbon bearing formations are often performed to collect seismic data that may be used to gain an understanding of the particular geological structure of each formation. For example, such data may be used to identify geological features, such as horizons and faults, within a volume of a subsurface formation. Seismic reflection is a technique of generating seismic waves and measuring the time taken for the seismic waves to travel from the source of the waves, reflect off subsurface geological features, and be detected by an array of receivers, such as geophone sensors, at the surface. Each receiver's response to a single shot of seismic energy is known as a trace and is recorded for analysis. In land acquisition, seismic waves are transmitted from the surface, produced either mechanically or by explosive device. Resulting reflections from the subsurface are received at geophone sensors. In marine data acquisition surveying geological structures underlying a body of water, a water-going vessel is utilized to tow acoustic sources and seismic streamers supporting an array of hydrophones to detect reflected seismic waves.

During acquisition of seismic data (e.g., traces), both data signals and noise may be recorded. In some cases, the noise may mask, or corrupt, the underlying data signals, which may complicate interpretation of the seismic data. Moreover, ineffective removal of the noise may degrade processing of the seismic data, as a portion of the data signals may be lost (e.g., may leak) during this process.

DESCRIPTION OF ILLUSTRATIVE EMBODIMENTS

Figure 1:
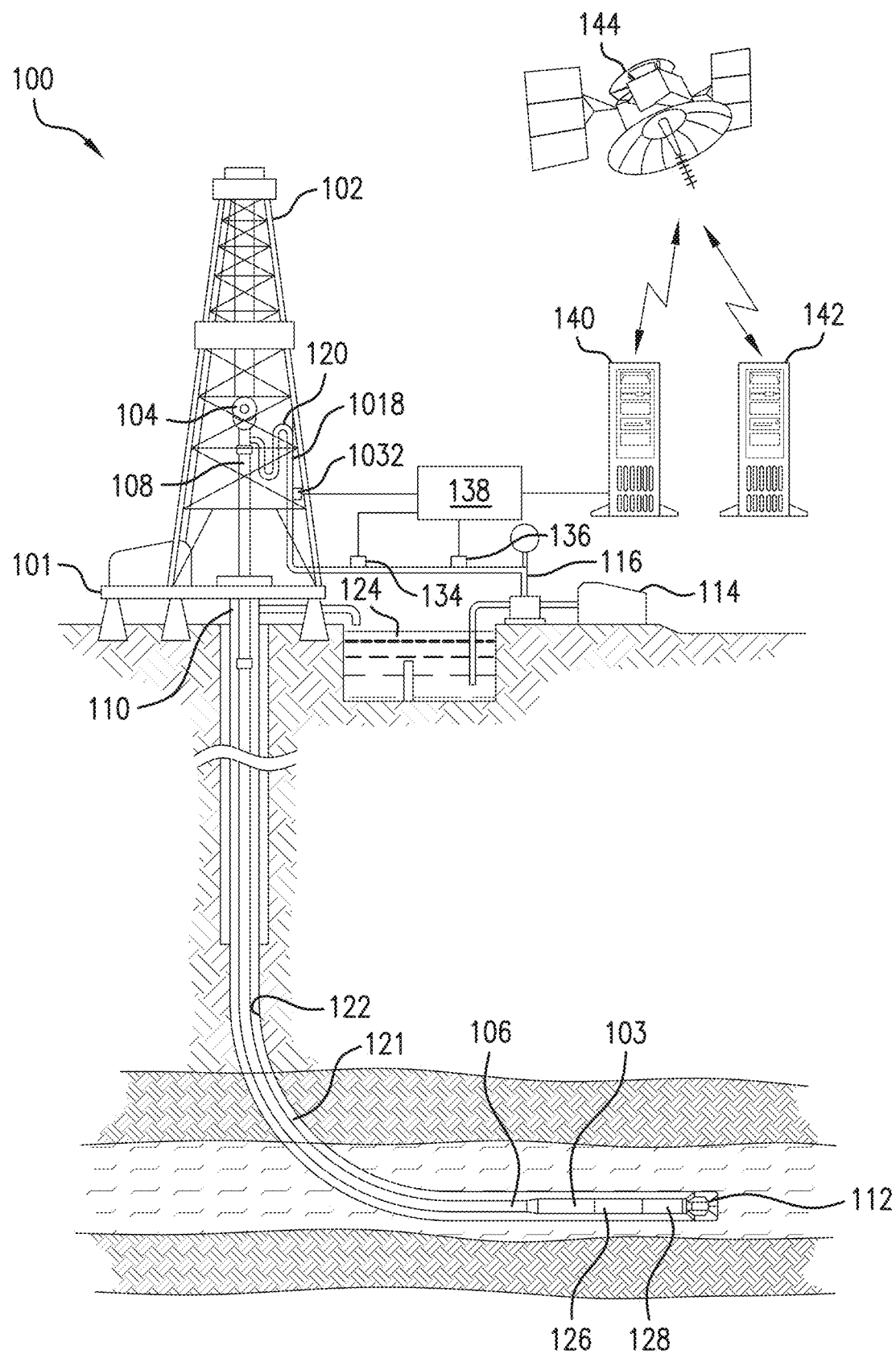
FIG. 1 is a diagram of an illustrative drilling system in which embodiments of the present disclosure may be implemented.

Embodiments of the present disclosure relate to attenuation (e.g., denoising) of random noise in seismic datasets. More specifically, the present disclosure relates to the training and use of complementary machine learning models (e.g., neural networks, machine learning algorithms, and/or the like) for the removal of random noise from a seismic dataset in a manner that limits leakage of data signals from the dataset. While the present disclosure is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility. For instance, the attenuation of random noise in any suitable dataset, such as medical images, distributed acoustic data, and/or the like, may be performed according to the techniques described herein. Further, when a particular feature, structure, or characteristic is described in connection with an embodiment, it is submitted that it is within the knowledge of one skilled in the relevant art to implement such feature, structure, or characteristic in connection with other embodiments whether or not explicitly described.

It would also be apparent to one of skill in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment.

As will be described in further detail below, embodiments of the present disclosure may relate to the attenuation (e.g., denoising) of random noise within seismic data (e.g., seismic data traces) corresponding to a subsurface reservoir formation. More specifically, embodiments of the present disclosure relate to the training and use of machine learning (e.g., artificial intelligence (AI)) to remove random noise, such as swell noise, from seismic data while limiting leakage (e.g., loss) of data signals from the seismic data. In some embodiments, complementary machine learning models (e.g., neural networks) may be employed to produce a denoised (e.g., clean) seismic dataset that maintains a certain level of signal strength (e.g., limits signal leakage). For instance, a first model may be trained to extract (e.g., filter out) random noises from seismic datasets, and, subsequently, the trained first model may be used to extract random noise from a "noisy" seismic dataset (e.g., a first seismic dataset). To that end, the first model may output the random noise extracted from the first seismic dataset. In some cases, random noise may mask (e.g., corrupt) an underlying data signal in a seismic dataset. In that regard, extracting random noise, such as extracting random noise using the first model, may involve extracting (e.g., removing) the underlying data signal from a seismic dataset. As such, signal loss (e.g., signal leakage) from the seismic dataset may occur. Accordingly, a second, complementary model may be trained to reconstruct a leaked signal (e.g., a data signal of a seismic dataset) from extracted random noise, such as the random noise extracted by the first model. The leaked signal output by the second model may be a data signal included in the random noise extracted by the first model. Further, in some embodiments, a cleaned dataset corresponding to the first seismic dataset may be produced based on the random noise extracted from the first seismic dataset by the first model and the leaked signal reconstructed by the second model. In particular, by removing (e.g., subtracting) the corresponding extracted random noise (e.g., output by the first model) from the first seismic dataset and by combining (e.g., adding) the corresponding leaked signal with the first seismic dataset, a cleaned seismic data set having a reduced level of random noise in comparison with the first seismic dataset may be produced. Moreover, the cleaned seismic dataset may have a greater signal strength than a seismic dataset that may result from extraction of the random noise (e.g., output by the first model) alone. In that regard, the loss (e.g., leakage) of signal between the first seismic dataset and the cleaned seismic dataset may be limited by the reconstruction and inclusion of the leaked signal in the cleaned seismic dataset.

In some embodiments, the first model may be trained based on a random noise library (e.g., a library of random noise profiles). In some embodiments, for example, a random noise sample associated with one or more seismic datasets may be used to generate the random noise library. The random noise sample may be substantially free of an underlying data signal. Moreover, the random noise library may be generated based on random scaling and/or augmenting of the random noise sample to produce different noise profiles. For instance, in some embodiments, random weighting may be applied to the random noise sample, the noise sample may be combined with an additional random noise sample, and/or the like to produce different noise profiles for the random noise library from the random noise sample.

The first model may further be trained based on a clean data sample. As described herein, the term "clean data sample" can refer to a data sample of seismic data that is substantially free of random noise. In some embodiments, such a clean data sample may be randomly scaled and/or augmented, as generally described above with respect to the random noise sample. The clean data sample may further be combined with random noise of the random noise library. The combination of the clean data sample with the random noise, along with the random noise library may be provided as training data for the first model (e.g., first training data) to train the first model to extract random noise from seismic datasets. In some embodiments, the robustness of the model may be increased by expanding the training data to include many different seismic surveys that add to both the noise and signal libraries.

In some embodiments, the second model may be trained based on the random noise sample, as well as extracted random noise, such as extracted random noise output by the first model. For instance, a leaked signal may be determined based on the extracted random noise and the random noise sample by, for example, removing (e.g., subtracting) the random noise sample from the extracted random noise. This leaked signal and the extracted random noise may be provided (e.g., as second training data) to the second model to train the second model to reconstruct leaked signals from extracted random noise.

Further, in some embodiments, the first model and/or the second model may be a generative adversarial network (GAN), which may employ a UNET architecture, a neural network, and/or the like. The GAN network of the first model and/or the second model may include a signal discriminator and a noise discriminator. The GAN network of the first model and/or the second model further includes a generator. Based on the training of the first and/or second model, the signal discriminator may be configured to identify an underlying data signal within an input to the corresponding model, and the noise discriminator may be configured to identify random noise within the input. The generator may be configured to produce an output of the corresponding model.

In some embodiments, a seismic data set cleaned (e.g., denoised) according to the techniques described herein (e.g., using the first and second models) may include one-dimensional (1D) or multi-dimensional (e.g., 2D or 3D) seismic data. Further, in some embodiments, the seismic data set may correspond to a single shot gather. In that regard, the techniques described herein may be employed without a comparison to data corresponding to the same data space (e.g., parallel seismic data). In some implementations, the model (e.g., neural network) may be trained using 3D seismic data and the trained model applied to denoise 2D seismic data (e.g., with geologically different regimes and signal signatures of the data). The 2D data may be used for purposes of prediction only and may not be part of the training data.

Illustrative embodiments and related methodologies of the present disclosure are described below in reference to FIGS. 1-10 as they might be employed in, for example, a computer system for well planning. Advantages of the disclosed random noise attenuation techniques include, for example and without limitation, a lower complexity, an improved performance, and a broad applicability with respect to other noise attenuation techniques. For instance, in some cases, random noise may be removed based on extensive testing. In particular, seismic data resulting from multiple and/or parallel shot gathers corresponding to a particular subsurface formation region and/or feature may be obtained, processed, and compared to identify random noise across the dataset. According to the techniques described herein, however, seismic data corresponding to a single shot gather may be denoised without requiring additional, related shot gathers. Moreover, in some cases, an algorithm may be developed for the particular subsurface formation region and/or feature to remove the identified random noise. This algorithm may be specific to the particular region. Accordingly, to use the algorithm for another formation, region, feature, and/or geography, the algorithm may be reparametrized (e.g., based on magnitude and/or types of random noise, for example), which may be computationally expensive (e.g., in terms of computational resources and/or time). The random noise attenuation involving machine learning that is described herein, on the other hand, may be flexibly used across different formations, regions, features, and/or geographies associated with respective subsurface formations. For instance, because the techniques described herein are tuned to adapt to and/or learn a variety of different random noise profiles, noise attenuation of these formations may be accounted for without intensive algorithm reparameterizations.

Other features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures are only exemplary and are not intended to assert or imply any limitation with regard to the environment, architecture, design, or process in which different embodiments may be implemented.

FIG. 1 is a diagram of an illustrative drilling system 100 in which embodiments of the present disclosure may be implemented as part of a downhole operation performed at a well site. For example, the disclosed embodiments may be incorporated as part of an overall seismic interpretation and well planning workflow for performing one or more downhole operations at a well site. Such downhole operations may include, but are not limited to, drilling, completion and injection stimulation operations for recovering petroleum, oil and/or gas, deposits from a hydrocarbon bearing formation. As shown in FIG. 1, a drilling platform 101 is equipped with a derrick 102 that supports a hoist 104. Drilling in accordance with some embodiments is carried out by a string of drill pipes connected together by "tool" joints so as to form a drill string 106. Hoist 104 suspends a top drive 108 that is used to rotate drill string 106 as the hoist lowers the drill string through wellhead 110. Connected to the lower end of drill string 106 is a drill bit 112. Drill bit 112 is rotated and drilling of a wellbore 122 is accomplished by rotating drill string 106, e.g., by top drive 108 or by use of a downhole "mud" motor (not shown) near drill bit 112 that turns the drill bit or by a combination of both top drive 108 and a downhole mud motor. Drilling fluid is pumped by mud pump 114 through flow line 116, stand pipe 1018, goose neck 120, top drive 108, and down through drill string 106 at high pressures and volumes to emerge through nozzles or jets in drill bit 112. The drilling fluid then travels back up the wellbore via an annulus 121 formed between the exterior of drill string 106 and the wall of wellbore 122, through a blowout preventer (not specifically shown), and into a mud pit 124 on the surface. On the surface, the drilling fluid is cleaned and then circulated again by mud pump 114. The drilling fluid is used to cool drill bit 112, to carry cuttings from the base of the borehole to the surface, and to balance the hydrostatic pressure in the rock formations.

In accordance with the various embodiments, drill string 106 may include various tools which create sensor data, such as a LWD tool 126 and a MWD tool 128. The distinction between LWD and MWD is sometimes blurred in the industry, but for purposes of this example, it may be assumed that LWD tool 126 is used to measure properties of the surrounding formation (e.g., porosity, permeability), and MWD tool 128 is used to measure properties associated with wellbore 122 (e.g., inclination, and direction). Tools 126 and 128 may be coupled to a telemetry device 103 that transmits data to the surface. Tools 126 and 128 along with telemetry device 103 may be housed within a bottom hole assembly (BHA) attached to the end of drill string 106.

In addition to measurements collected by downhole tools 126 and 128, a seismic survey may be conducted to provide seismic mapping of the subsurface formation in this example. In order to conduct a seismic survey, one or more seismic source devices at the surface of the formation generate seismic waves which travel into the subsurface layers. Such source devices may include, for example and without limitation, dynamite or other explosives, thumper trucks, air guns, or other noise sources. The seismic waves partially reflect off the subsurface geological features, e.g., horizons and faults, encountered by the seismic waves. The seismic waves reflected back towards the earth's surface are received by an array of seismic receivers, e.g., geophones, and arrival times and amplitudes are recorded.

Such a surface seismic survey may serve as an initial exploratory survey conducted over a relatively large area of the formation in order to obtain a low-resolution mapping of the formation's geometry. Such a broad-based seismic survey may be used in conjunction with core samples and/or well logs from one or more exploratory wellbores for purposes of hydrocarbon exploration and well planning. From the initial exploratory survey, a target area within the formation may be selected for further exploration and well planning purposes. A more detailed vertical seismic profile (VSP) survey of the selected target area may then be conducted. To conduct the VSP survey, the waves of seismic energy and direct arrival times from the seismic source devices at the surface may be detected and recorded by an array of seismic receivers disposed within wellbore 122. In some implementations, the seismic receivers may be downhole seismic sensors, e.g., geophones or hydrophones, coupled to or integrated within the BHA of drill string 106 alongside telemetry device 103 and downhole tools 126 and 128.

In one or more embodiments, telemetry device 103 may use any of various communication techniques to send the sensor data collected downhole to the surface. For example, in some cases, telemetry device 103 may send the sensor data to the surface using electromagnetic telemetry. In other cases, telemetry device 103 may send the data by way of electrical or optical conductors embedded in the pipes that make up drill string 106. In yet still other cases, telemetry device 103 modulates a resistance to drilling fluid flow within the drill string to generate pressure pulses that propagate at the speed of sound of the drilling fluid to the surface, and where the sensor data is encoded in the pressure pulses.

In the mud pulse telemetry example above, one or more transducers, such as transducers 1032, 134 and/or 136, convert the pressure signal into electrical signals for a signal digitizer 138 (e.g., an analog to digital converter). Additional surface-based sensors creating sensor data (e.g., RPM measuring devices, drilling pressure measuring devices, mud pit level measuring devices) may also be present, but are not shown so as not to further complicate the figure. Digitizer 138 supplies a digital form of the many sensor measurements to a computer 140, e.g., computer system 1000 of FIG. 10 or some other form of a data processing device. Computer 140 operates in accordance with software (which may be stored on a computer-readable storage medium) to process and decode the received signals, and to attenuate random noise from data, as described herein.

In accordance with at least some embodiments, a seismic dataset (e.g., a set of seismic traces) resulting from a seismic survey may be denoised. In particular, random noise within the seismic dataset may be attenuated. In some embodiments, the seismic dataset may be denoised by the computer 140, and in some embodiments, the surface computer 140 may forward the seismic dataset to another computer system 142, such as a backend computer system operated by an oilfield services provider by way of a remote connection, for denoising and/or analysis (e.g., processing). To that end, the well site may be remotely monitored and/or controlled via a communication network. The communication of data between computer system 140 and computer system 142 may take any suitable form, such as over the Internet, by way of a local or wide area network, or as illustrated over a satellite 144 link.

In one or more embodiments, computer 140 and/or the computer system 142 may execute a well planning application for automating well planning and data analysis workflows during both planning and implementation phases of a downhole operation performed along a planned path of a wellbore through a subsurface formation. In some implementations, the well planning application may incorporate the random noise attenuation functionality described herein as part of a seismic processing and/or interpretation module of the application. A GUI of such a well planning and seismic processing and/or interpretation application may be used to model the subsurface formation or to update an existing model, for example. The generated or updated formation model may then be used to identify or modify potential targets within the formation for hydrocarbon exploration and production operations and adjust the planned path of the wellbore accordingly.

Figure 2:
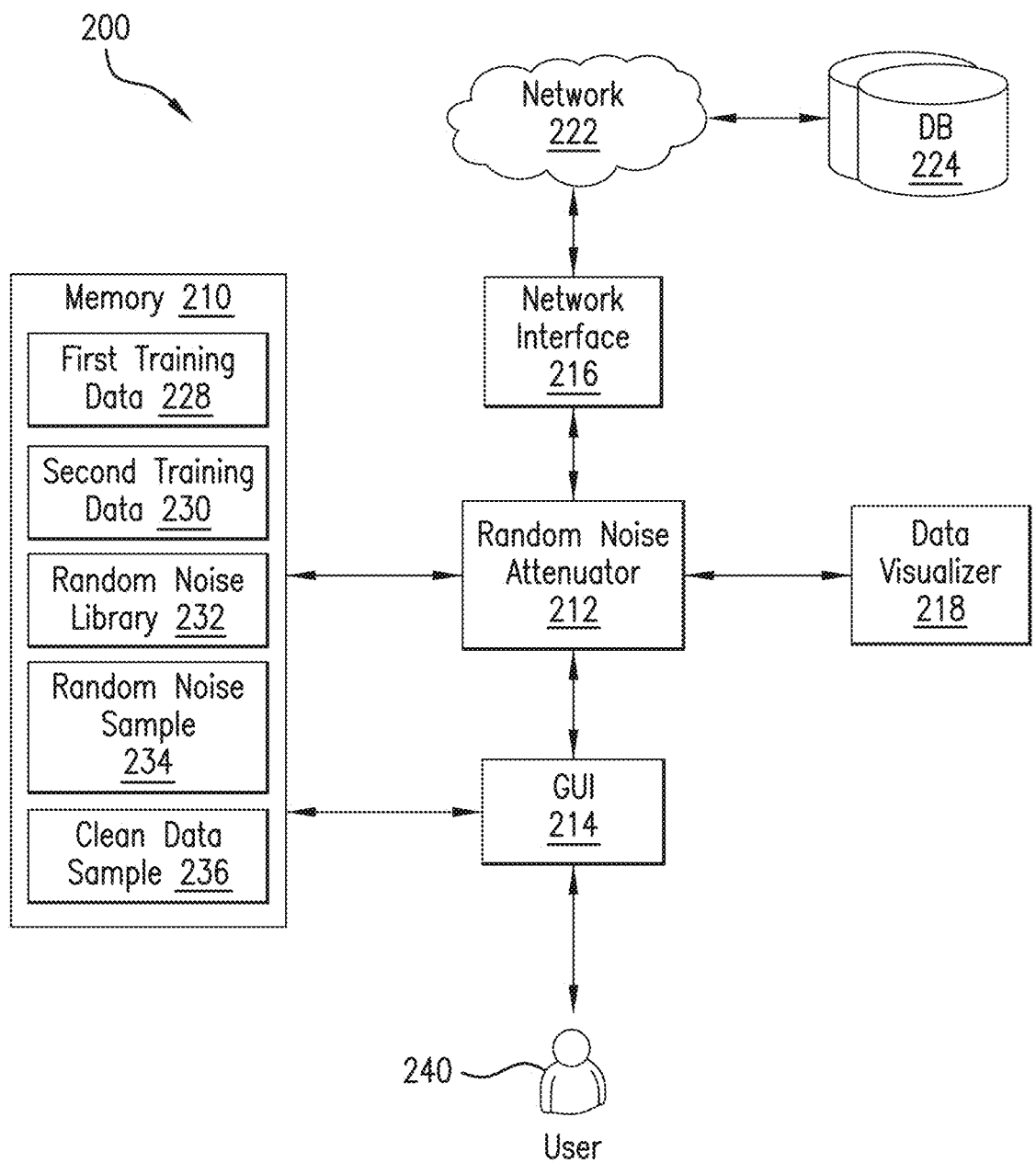
FIG. 2 is a block diagram of an illustrative system in which embodiments of the present disclosure may be implemented.

Turning now to FIG. 2, a block diagram of an exemplary system 200 for denoising seismic data that includes random noise (e.g., attenuating random noise of the seismic data) is illustrated. As shown in FIG. 2, system 200 includes a memory 210, a random noise attenuator 212, a graphical user interface (GUI) 214, a network interface 216, and a data visualizer 218. In some embodiments, memory 210, random noise attenuator 212, GUI 214, network interface 216, and data visualizer 218 may be communicatively coupled to one another via an internal bus of system 200. Further, in some embodiments, one or more of the components, functions, and/or operations of the system 200 may be included within and/or performed by the computer system 140 of FIG. 1.

Figure 10:
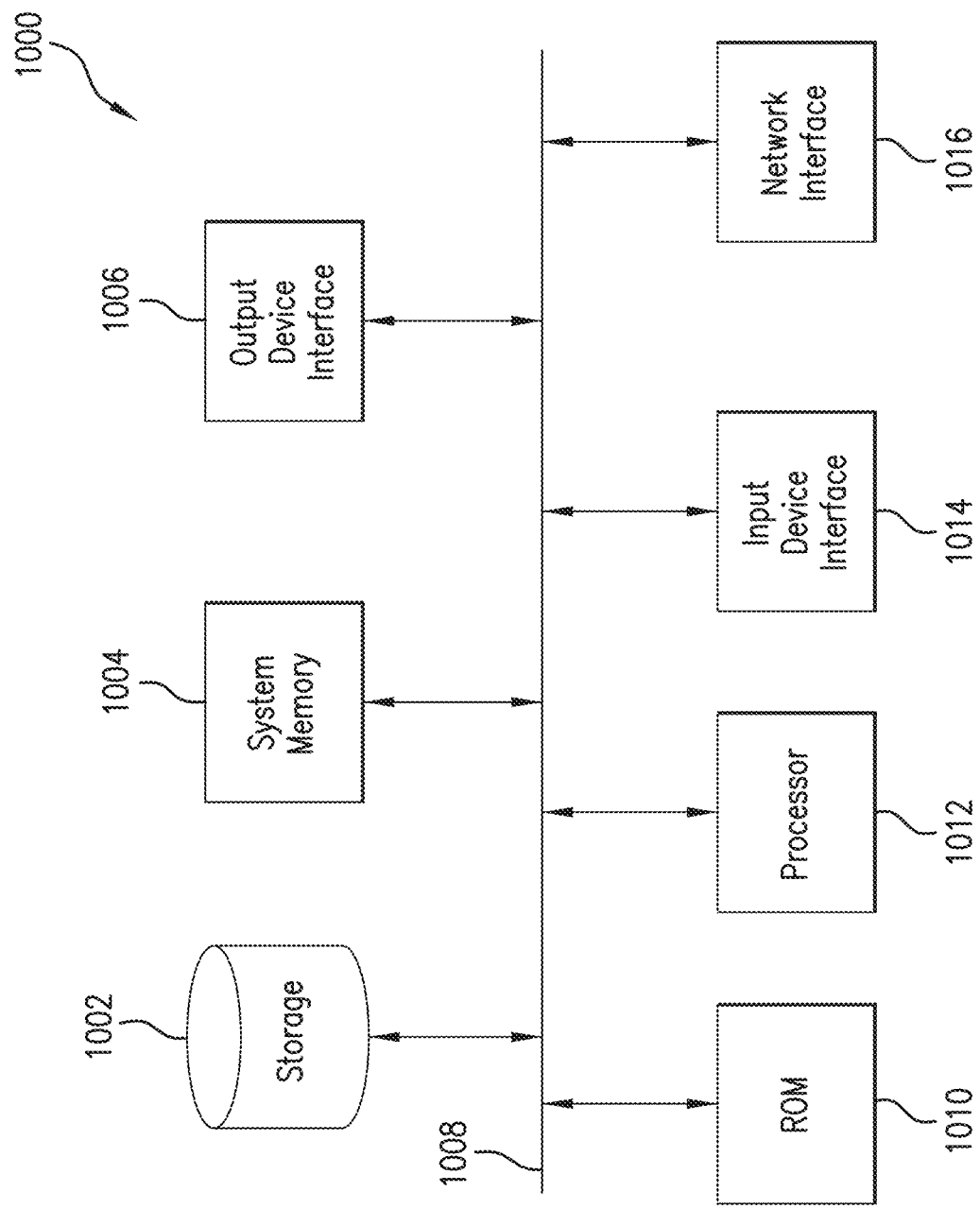
FIG. 10 is a block diagram of an illustrative computer system in which embodiments of the present disclosure may be implemented.

System 200 may be implemented using any type of computing device having at least one processor and a memory, such as the computer system 140 of FIG. 1 and/or the system 1000 of FIG. 10. The memory may be in the form of a processor-readable storage medium for storing data and instructions executable by the processor. Examples of such a computing device include, but are not limited to, a tablet computer, a laptop computer, a desktop computer, a workstation, a mobile phone, a personal digital assistant (PDA), a set-top box, a server, a cluster of computers in a server farm or other type of computing device. In some implementations, system 200 may be a server system located at a data center associated with the hydrocarbon producing field. The data center may be, for example, physically located on or near the field. Alternatively, the data center may be at a remote location away from the hydrocarbon producing field. The computing device may also include an input/output (I/O) interface for receiving user input or commands via a user input device (not shown). The user input device may be, for example and without limitation, a mouse, a QWERTY or T9 keyboard, a touch-screen, a graphics tablet, or a microphone. The I/O interface also may be used by each computing device to output or present information to a user via an output device. The output device may be, for example, a display coupled to or integrated with the computing device for displaying a digital representation of the information being presented to the user.

Although only memory 210, random noise attenuator 212, GUI 214, network interface 216, and data visualizer 218 are shown in FIG. 2, it should be appreciated that system 200 may include additional components, modules, and/or sub-components as desired for a particular implementation. It should also be appreciated that memory 210, random noise attenuator 212, GUI 214, network interface 216, and data visualizer 218 may be implemented in software, firmware, hardware, or any combination thereof. Furthermore, it should be appreciated that embodiments of memory 210, random noise attenuator 212, GUI 214, network interface 216, and data visualizer 218, or portions thereof, can be implemented to run on any type of processing device including, but not limited to, a computer, workstation, embedded system, networked device, mobile device, or other type of processor or computer system capable of carrying out the functionality described herein.

As will be described in further detail below, memory 210 can be used to store information accessible by the random noise attenuator 212 and/or the GUI 214 for implementing the functionality of the present disclosure. The memory 210 can additionally or alternatively be accessed by the data visualizer 218 and/or the like. Memory 210 may be any type of recording medium coupled to an integrated circuit that controls access to the recording medium. The recording medium can be, for example and without limitation, a semiconductor memory, a hard disk, or similar type of memory or storage device. In some implementations, memory 210 may be a remote data store, e.g., a cloud-based storage location, communicatively coupled to system 200 over a network 222 via network interface 216 (e.g., a port, a socket, an interface controller, and/or the like). Network 222 can be any type of network or combination of networks used to communicate information between different computing devices. Network 222 can include, but is not limited to, a wired (e.g., Ethernet) or a wireless (e.g., Wi-Fi or mobile telecommunications) network. In addition, network 222 can include, but is not limited to, a local area network, medium area network, and/or wide area network such as the Internet.

In some embodiments, the random noise attenuator 212 (e.g., a machine learning algorithm) may be at least partially implemented as a neural network. Moreover, in some embodiments, the random noise attenuator 212 may be implemented using multiple neural networks. For instance, the random noise attenuator 212 may include a first model (e.g., a first machine learning model) implemented via one or more neural networks, as well as a second model (e.g., a second machine learning model) implemented via one or more neural networks. In particular, the first model and the second model may each include a generative adversarial network (GAN), which may include a signal discriminator, a noise discriminator, and a generator, as described in greater detail below. In that regard, each of the first model and the second model may include three networks (e.g., a network corresponding to the signal discriminator, a network corresponding noise discriminator, and a network corresponding to the generator), and the random noise attenuator 212 may include six networks (e.g., six machine learning networks). In some embodiments, the random noise attenuator 212 may additionally or alternatively include a loss sensitive GAN (LSGAN) with one or more additional loss functions, such as perceptual loss functions, mean absolute error, and/or frequency wavenumber loss function, for the first model and/or the second model.

In some embodiments, the random noise attenuator 212 may be trained to attenuate random noise from a seismic dataset. The random noise attenuator 212 may be trained using training data, such as the first training data 228 and the second training data 230. In particular, the first model of the random noise attenuator 212 may be trained using the first training data 228, and the second model of the random noise attenuator 212 may be trained using the second training data 230. In some embodiments, the first model may be trained, using the first training data 228, to extract (e.g., reconstruct) random noise from a seismic dataset input to the random noise attenuator 212 and/or the first model. To that end, the first model, once trained, may output extracted random noise corresponding to the input seismic dataset. The second model may be trained, using the second training data 230, to reconstruct (e.g., recover and/or extract) a leaked signal from extracted random noise, such as extracted random noise output by the first model. In some embodiments, for example, random noise may mask and/or corrupt underlying data signals in the seismic dataset. In that regard, random noise removed (e.g., extracted) from by the first model from a seismic dataset may include a data signal. That is, for example, a leaked signal (e.g., corresponding to data of the seismic dataset) may be present in the extracted random noise and/or the seismic dataset may experience signal loss (e.g., signal leakage) resulting from the extraction of the random noise. For instance, subtracting (e.g., removing) the extracted random noise from the seismic dataset may remove a data signal corresponding to the leaked signal from the seismic dataset. The second model, once trained, may output a reconstructed leaked signal corresponding to the seismic data input to the random noise attenuator 212, effectively recovering the data included in the leaked signal. To that end, the random noise attenuator 212 may be configured, to produce a cleaned (e.g., denoised) seismic dataset from a seismic dataset, use the trained first model to extract random noise and use the trained second model to reconstruct a leaked signal from the extracted random noise. The random noise attenuator 212 may use the extracted random noise and the leaked signal to generate the cleaned seismic dataset from the seismic dataset by, for example, removing the extracted random noise from and adding the leaded signal to the seismic dataset. Further details of the random noise attenuation (e.g., denoising) of seismic datasets by the random noise attenuator 212 are provided with respect to FIGS. 3-9.

In some embodiments, the first training data 228 may include data associated with a random noise library 232. The random noise library 232 may include a variety of different random noise profiles. For instance, the system 200 may generate (e.g., populate) the random noise library 232 based on one or more random noise sample(s) 234, in some embodiments. A random noise sample 234 may be a random noise or a portion thereof, which may be extracted from a seismic dataset. In particular, the random noise sample 234 may be produced such that the random noise sample 234 includes substantially no data (e.g., no leaked signal) from the seismic dataset. In some embodiments, for example, random noise that has relatively little effect (e.g., is distinct from) seismic data may be extracted via filtering to produce the random noise sample 234. Further, the random noise sample may be randomly scaled and/or augmented to produce different noise profiles for the random noise library 232. For instance, random weighting may be applied to the random noise sample 234, the random noise sample 234 may be combined with an additional random noise sample, and/or the like, which may produce different noise profiles for the random noise library 232.

The first training data 228 may further include data associated with a clean data sample 236. The clean data sample 236 may be a sample of seismic data that is substantially free of random noise. For instance, the clean data sample 236 may be obtained from a portion of a seismic dataset that lacks random noise or via filtering (e.g., automated filtering or seismic processing) and/or a manual selectin of the sample. The filtering to remove the random noise may include some leaked signal once the output is cleaned of random noise. The cleaned output from the filtering should not include any of the random noise, as it can potentially degrade the performance of the network. In some cases, the clean data sample 236 may be obtained from the same or a different seismic dataset than the random noise sample 234. In some embodiments, the clean data sample 236 may be randomly augmented and/or scaled by, for example, random weighting of the clean data sample 236 and/or combination of the clean data sample 236 with an additional clean data sample. The system 200 may scale the clean data sample 236, for example. Further, in some embodiments, the clean data sample 236 (e.g., the scaled clean data sample 236) may be added with random noise from the random noise library 232, such as an augmented version of the random noise sample 234. In this regard, the clean data sample 236 and the random noise library 232 and/or the random noise sample 234 may be used to produce seismic data (e.g., an additional data sample) corresponding to actual seismic data (e.g., seismic data that is not synthetically generated) that includes random noise. In some embodiments, the additional data sample that includes the combination of the clean data sample 236 and random noise may be included in the first training data 228. To that end, random noise from the random noise library 232, such as the scaled and/or augmented random noise sample 234, as well as additional data sample may be provided to the first model to train the first model. In that regard, the first model may be trained to extract random noise from seismic data based on determining a mapping between the random noise included in the first training data 228 and the random noise included in the additional data sample of the first training data 228.

In some embodiments, the second training data 230 may include data associated with an output by the first model (e.g., random noise extracted by the first model), as well as a leaked signal. In some embodiments, for example, the leaked signal may be a data signal included in the output (e.g., the extracted random noise) of the first model. To that end, the leaked signal may be identified (e.g., reconstructed) based on the extracted random noise and the random noise provided to the first model (e.g., within the first training data 228), such as random noise corresponding to the random noise sample 234 and/or the random noise library 232. For instance, in some embodiments, removing (e.g., subtracting) the random noise of the first training data 228 used to produce an output (e.g., extracted random noise) at the first model from the output may provide the leaked signal. Thus, providing second training data 230 to the second model may involve providing the output of the first model and a leaked signal corresponding to (e.g., included within) this output. In that regard, the second model may be trained to reconstruct leaked signals based on determining a mapping between the output of the first model and the leaked signal corresponding to the output.

As shown in FIG. 2, memory 210 may be used to store first training data 228, second training data 230, a random noise library 232, one or more random noise sample(s) 234, and/or one or more clean data sample(s) 236. In some embodiments, any of the first training data 228, second training data 230, a random noise library 232, one or more random noise sample(s) 234, and/or one or more clean data sample(s) 236 may additionally or alternatively be obtained from a database, such as database 224. In particular, data may be communicated from the database 224 via the network 222 and/or the network interface 216. In some embodiments, for example, the first training data 228, second training data 230, a random noise library 232, one or more random noise sample(s) 234, and/or one or more clean data sample(s) 236 may be stored within the memory 210 after it is communicated from the database 224. Database 224 may be any type of data storage device, e.g., in the form of a recording medium coupled to an integrated circuit that controls access to the recording medium. The recording medium can be, for example and without limitation, a semiconductor memory, a hard disk, or similar type of memory or storage device accessible to system 200. Further, as shown in FIG. 2, database 224 may be implemented as a remote database communicatively coupled to components of the system 200 via network 222.

In some embodiments, the system 200 may output a visual representation of random noise extracted, a leaked signal reconstructed, and/or a cleaned seismic dataset produced by the random noise attenuator 212. For instance, such a visual representation may be output to a display device (e.g., an electronic display), such as a monitor. The visual representation may be a numerical indication, a graphical indication, a textual indication, or a combination thereof. Further, the visual representation may be output to and/or by the GUI 214 and/or the data visualizer 218. For instance, the visual representation may be output to the GUI 214, which may be provided on a display (e.g., an electronic display). The display may be, for example and without limitation, a cathode ray tube (CRT) monitor, a liquid crystal display (LCD), or a touch-screen display, e.g., in the form of a capacitive touch-screen light emitting diode (LED) display. Further, the data visualizer 218 may be used to generate different data visualizations, such as bar graphs, pie graphs, histograms, plots, charts, numerical indications, textual indications, and/or the like based on the extracted random noise, the reconstructed leaked signal, and/or the cleaned seismic dataset. The data visualizer 218 may further perform any suitable data analysis on the extracted random noise, the reconstructed leaked signal, and/or the cleaned seismic dataset, such as interpolation, extrapolation, averaging, determining a standard deviation, summing or subtracting, multiplying or dividing, and/or the like. In this way, the extracted random noise, the reconstructed leaked signal, and/or the cleaned seismic dataset may be used for the purposes of reservoir simulations and well planning. Moreover, the cleaned seismic dataset may include a lower level of random noise corrupting (e.g., distorting) seismic data signals than seismic data associated with the reservoir formation that is not denoised by the random noise attenuator 212. Accordingly, providing (e.g., outputting and/or displaying) the cleaned seismic dataset better (e.g., more accurate) analysis of a reservoir formation may be facilitated.

In some embodiments, GUI 214 enables a user 240 to view and/or interact directly with the visual representation of one or more outputs of the random noise attenuator 212 (e.g., the visual representation of the extracted random noise, the reconstructed leaked signal, the cleaned seismic dataset, and/or the like). For example, the visual representation (e.g., segmentation data, model, or other numerical, textual, and/or graphical representation) may be displayed in association with the GUI 214 to the user 240. Further, in some embodiments, the user 240 may use a user input device (e.g., a mouse, keyboard, microphone, touch-screen, a joystick, and/or the like) to interact with the visual representation at the GUI 214. For instance, in some embodiments, the GUI 214 may receive a user input provided by the user 240 via such a device. In particular, a user input may be provided to modify, accept, or reject the extracted random noise, the reconstructed leaked signal, the cleaned seismic dataset, and/or the like. In some embodiments, the extracted random noise, the reconstructed leaked signal, the cleaned seismic dataset, and/or the like may thus be updated based on a user input. Moreover, in some embodiments, such a user input may alter the training of the random noise attenuator 212 (e.g., training of the first model and/or the second model of the random noise attenuator 212), as described in greater detail below. The GUI 214 may additionally or alternatively receive a user input to generate the cleaned seismic dataset, to generate a particular data visualization (e.g., via the data visualizer 218), to run a particular simulation with the cleaned seismic dataset, to adjust a characteristic of the random noise attenuator 212 and/or a visual representation, and/or the like.

While certain components of the system 200 are illustrated as being in communication with one another, embodiments are not limited thereto. To that end, any combination of the components illustrated in FIG. 2 may be communicatively coupled.

Figure 3:
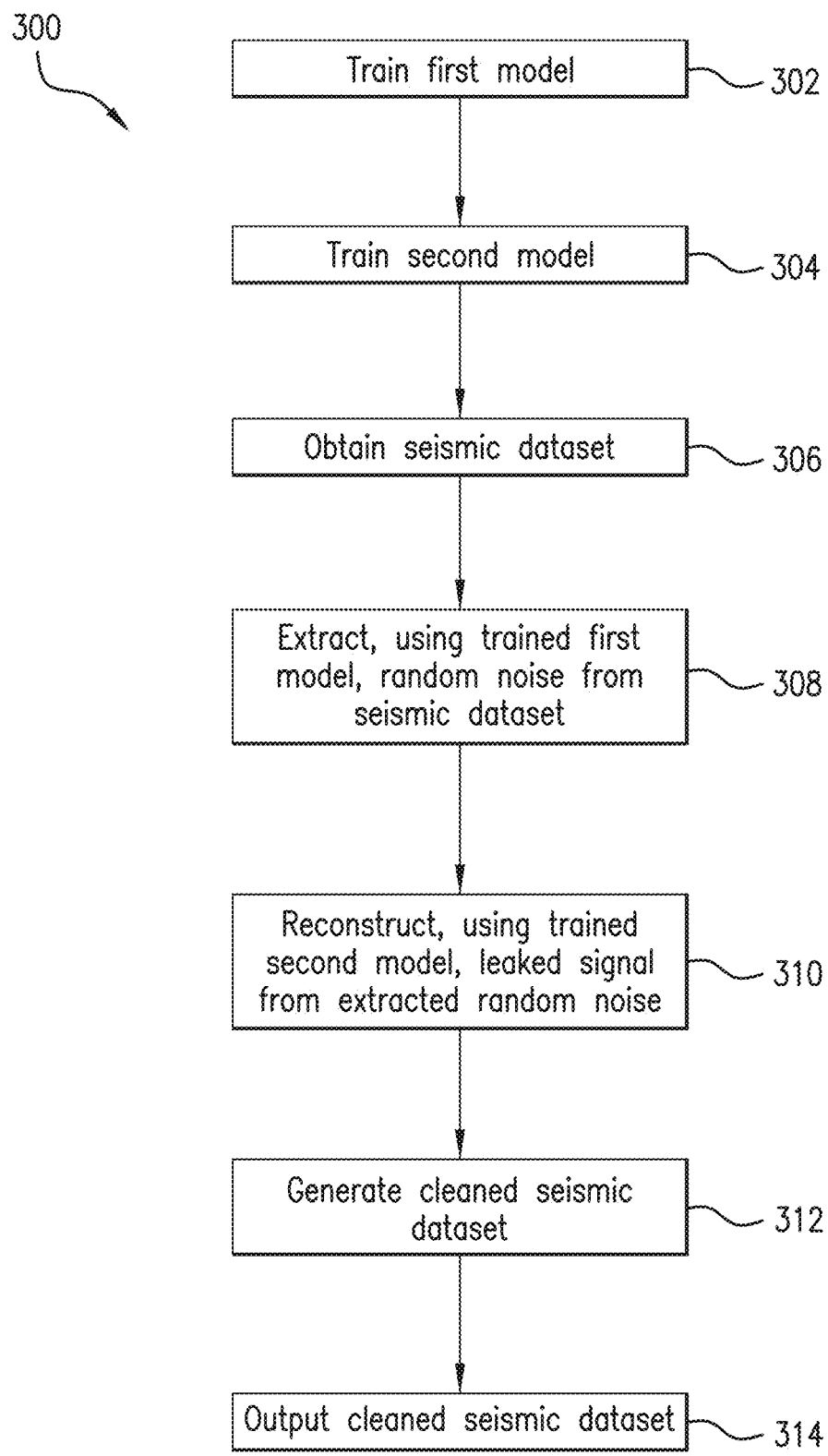
FIG. 3 is a flowchart of an illustrative process for random noise attenuation, in accordance with embodiments of the present disclosure.

FIG. 3 is a flowchart of an illustrative process 300 for automatic digital rock segmentation using a deep learning model. For discussion purposes, process 300 will be described with reference to FIGS. 1-2 and 4-9. However, process 300 is not intended to be limited thereto.

In block 302, the process 300 involves training a first model, such as the first model of the random noise attenuator 212. In particular, the first model may be trained to extract random noises from seismic datasets. In some embodiments, the first model may be trained based on the first training data 228. To that end, the first model may be trained based on the random noise library 232, the random noise sample 234, the clean data sample 236, and/or the like, as described above. For instance, the first model may be trained based on a scaling and/or augmentation of the random noise sample 234, which may be included in the random noise library 232, as well as an additional data sample generated based on the clean data sample 236 and the random noise sample 234 (e.g., based on the randomly scaled and/or augmented random noise sample 234). Details of training the first are provided in FIG. 4.

Figure 4:
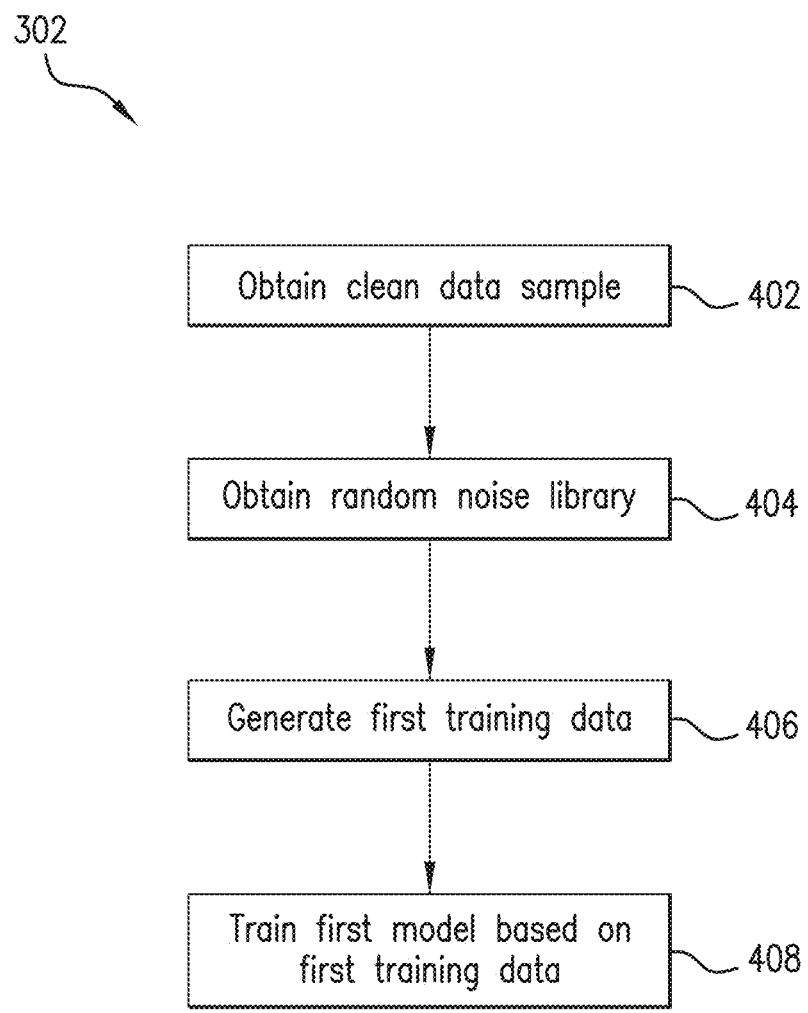
FIG. 4 is a flowchart of an illustrative process for training a first machine learning model, in accordance with embodiments of the present disclosure.

With reference now to FIG. 4, a flowchart of an illustrative process for training a first model (e.g., the first model of the random noise attenuator 212) in accordance with block 302 of FIG. 3 is shown. For discussion purposes, FIG. 4 will be described with reference to the system 200 of FIG. 2 and FIG. 3. However, embodiments are not intended to be limited thereto.

In block 402, a clean data sample, such as the clean data sample 236, is obtained. In some embodiments, obtaining the clean data sample 236 may involve retrieving the clean data sample 236 from a memory or storage device, such as memory 210 or database 224. Moreover, as described above, obtaining the clean data sample 236 may involve obtaining a portion of seismic data that is substantially free of random noise. To that end, the clean data sample 236 may be obtained based on a user selection (e.g., via a user input device) of the clean data sample 236 from among a seismic dataset. The clean data sample 236 may additionally or alternatively be obtained based on filtering of the seismic data, based on a comparison of the portion of seismic data with a corresponding portion of additional seismic data, and/or the like. In some embodiments, for example, multiple and/or parallel seismic data gathers of an area of a subsurface reservoir formation may be obtained and corresponding portions of seismic datasets corresponding to these data gathers may be compared to identify random noise occurring in some but not all of the seismic datasets. A portion of seismic data lacking the identified random noise may then be selected and/or filtered to obtain the clean data sample 236.

In block 404, a random noise library, such as the random noise library 232, is obtained. In some embodiments, obtaining the random noise library 232 may involve retrieving the random noise library 232 from a memory or storage device, such as memory 210 or database 224. Moreover, as described above, obtaining the random noise library 232 may involve randomly scaling and/or augmenting (e.g., altering) a random noise sample (e.g., the random noise sample 234), which may be included in the memory 210 or the database 224.

In block 406, first training data, such as the first training data 228, may be generated. In some embodiments, the first training data 228 may include data provided to the first model to train the first model to extract random noises from seismic datasets. The data provided to the first model for training may include seismic data including random noise, as well as random noise corresponding to the seismic data, in some embodiments. In that regard, generating the first training data 228 may involve determining and/or obtaining a random noise of the random noise library 232 (e.g., the random noise library obtained at block 404). Further, generating the first training data 228 may involve determining and/or obtaining seismic data that includes random noise, such as the random noise of the random noise library 232. In some embodiments, for example, the clean data sample 236 (e.g., the clean data sample obtained at block 402) may be combined with the random noise to generate the seismic data for the first training data 228. The generated seismic data of the first training data 228 may thus be associated with the random noise of the first training data 228. Further, the clean data sample 236 combined with the random noise may be augmented (e.g., weighted, scaled, and/or the like) in some embodiments. For instance, the clean data sample 236 may be augmented before being combined with the random noise in some cases.

In block 408, the first model is trained based on the first training data (e.g., the first training data 228). In particular, the first model may be configured to use the first training data 228 to determine a mapping between the random noise of the first training data 228 and the seismic data (e.g., that includes random noise) of the first training data 228. Based on this mapping, the first model may be trained to identify and/or extract (e.g., reconstruct) random noises from other seismic datasets, which may be different than the seismic data of the first training data 228. Further, in some embodiments, the first model may be implemented as a GAN network and or a LSGAN network, as described above. In that regard, the first model may include a signal discriminator, a noise discriminator, and a generator. Accordingly, in some embodiments, training the first model may involve training the signal discriminator, the noise discriminator, and/or the generator based on the first training data. For instance, the signal discriminator may be trained, based on the first training data 228, to identify seismic data signals within the first training data 228. The noise discriminator may be trained, based on the first training data 228, to identify random noise within the first training data 228. The generator may be trained, based on the first training data 228, to output extracted random noise based on the identified seismic data signals and/or the identified random noise provided by the signal discriminator or the noise discriminator, respectively.

Moreover, with additional random noise samples 234 and/or scaling and/or augmentations thereof, a quantity of different profiles of random noises included in the random noise library 232 may increase. To that end, the first model may be repeatedly trained and/or re-trained as the data (e.g., the first training data 228) available to the random noise attenuator 212 changes. In some embodiments, training and/or re-training the first model based on additional data, such as additional random noise profiles, may increase the likelihood that the first model is able to accurately identify and extract random noise (e.g., the profile of the random noise) from a given seismic dataset. Accordingly, it may be appreciated that one or more blocks of the flowchart illustrated in FIG. 4 may be repeated.

Turning back now to FIG. 3, in block 304, the process 300 involves training a second model, such as the second model of the random noise attenuator 212. In particular, the second model may be trained to reconstruct (e.g., extract) leaked signals from extracted random noise, such as random noise extracted by the first model. In some embodiments, the second model may be trained based on the second training data 230. To that end, the second model may be trained based on an output of the first model, a random noise of the random noise library 232 corresponding to the output, a leaked signal identified based on the output and the random noise, and/or the like, as described above. For instance, the second model may be trained based on the output of the first model and a leaked signal identified based on the output and the random noise of the random noise library 232. In particular, the leaked signal may be identified by removing the random noise from the output of the first model (e.g., an extracted random noise). Details of training the first are provided in FIG. 5.

Figure 5:
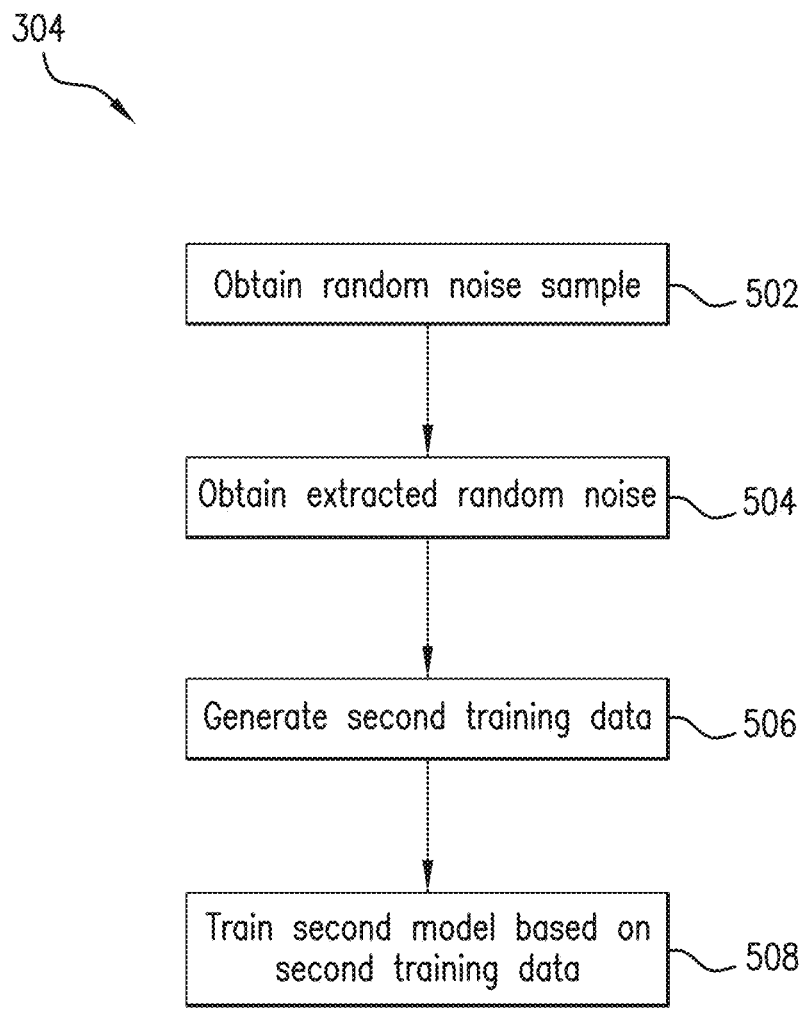
FIG. 5 is a flowchart of an illustrative process for training a second machine learning model, in accordance with embodiments of the present disclosure.

With reference now to FIG. 5, a flowchart of an illustrative process for training a second model (e.g., the second model of the random noise attenuator 212) in accordance with block 304 of FIG. 3 is shown. For discussion purposes, FIG. 5 will be described with reference to the system 200 of FIG. 2 and FIG. 3. However, embodiments are not intended to be limited thereto.

In block 502, a random noise sample, such as the random noise sample 234, is obtained. In some embodiments, obtaining the random noise sample 234 may involve retrieving the random noise sample 234 from a memory or storage device, such as memory 210 or database 224. Moreover, as described above, obtaining the random noise sample 234 may involve obtaining a portion of seismic data that is substantially free of data signal. To that end, the random noise sample 234 may be obtained based on a user selection (e.g., via a user input device) of the random noise sample 234 from among a seismic dataset. The random noise sample 234 may additionally or alternatively be obtained based on filtering of the seismic data, based on a comparison of the portion of seismic data with a corresponding portion of additional seismic data, and/or the like. In some embodiments, for example, multiple and/or parallel seismic data gathers of an area of a subsurface reservoir formation may be obtained and corresponding portions of seismic datasets corresponding to these data gathers may be compared to identify random noise occurring in some but not all of the seismic datasets. The identified random noise may then be selected and/or filtered to obtain the random noise sample 234.

In block 504, extracted random noise, such as random noise extracted by the first model of the random noise attenuator 212, may be obtained. In some embodiments, the extracted random noise may this be obtained by obtaining an output of the first model. In some embodiments, the extracted random noise may additionally or alternatively be retrieved from a memory or storage device, such as memory 210 or database 224. For instance, in some embodiments, the system 200 and/or the random noise attenuator 212 may be arranged so that the output of the first model of the random noise attenuator 212 is saved (e.g., stored) in the memory 210 or the database 224.

In block 506, second training data, such as the second training data 230, may be generated and/or obtained. In some embodiments, the second training data 230 may include data provided to the second model to train the second model to reconstruct a leaked signal from extracted random noise, such as random noise extracted and output by the first model. The data provided to the second model for training may include an extracted random noise, as well as a leaked signal identified as being included in the extracted random noise, in some embodiments. In that regard, generating the second training data 230 may involve determining and/or obtaining extracted random noise (e.g., the extracted random noise obtained at block 504). Further, generating the second training data 230 may involve determining and/or obtaining a leaked signal included in the extracted random noise. In some embodiments, for example, the random noise sample obtained at block 502, which may be associated with the extracted random noise, may be used to determine the leaked signal. For instance, the random noise sample may be a sample used by the first model to produce the extracted random noise, such as a sample included in the first training data 228. Accordingly, removing (e.g., subtracting) the random noise sample from the extracted random noise, may remove substantially all of the random noise from the extracted random noise, leaving the leaked signal. In some embodiments, the random noise sample may be scaled and/or augmented before use at the first model to generate the extracted random noise and/or use to determine the leaked signal. In any case, the leaked signal of the second training data 230 may be associated with the extracted random noise of the second training data 230.

In block 508, the second model is trained based on the second training data (e.g., the second training data 230). In particular, the second model may be configured to use the second training data 230 to determine a mapping between the extracted random noise (e.g., that includes a leaked signal) of the second training data 230 and the leaked signal of the second training data 230. Based on this mapping, the second model may be trained to identify and/or reconstruct (e.g., extract) leaked signals from other extracted random noises, which may correspond to other seismic datasets. The other extracted random noises may be different from the extracted random noise included in the second training data 230, for example. Further, in some embodiments, the second model may be implemented as a GAN network and or a LSGAN network, as described above. In that regard, the second model may include a signal discriminator, a noise discriminator, and a generator. Accordingly, in some embodiments, training the second model may involve training the signal discriminator, the noise discriminator, and/or the generator based on the second training data 230. For instance, the signal discriminator may be trained, using the extracted random noise and the leaked signal of the second training data 230, to identify seismic data signals within seismic data. The noise discriminator may be trained using the second training data 230, and, more specifically, the extracted random noise of the second training data 230. The generator may be trained, based on the second training data 230, to output a reconstructed leaked signal based on the identified seismic data signals (e.g., identified leaked signals) and/or the identified random noise provided by the signal discriminator or the noise discriminator, respectively.

Moreover, the second model may be repeatedly trained and/or re-trained as the data (e.g., the second training data 230) available to the random noise attenuator 212 changes. In some embodiments, training and/or re-training the second model may improve the second model's ability to accurately reconstruct a leaked signal. Accordingly, it may be appreciated that one or more blocks of the flowchart illustrated in FIG. 5 may be repeated.

With reference again to FIG. 3, in block 306, the process 300 involves obtaining a seismic dataset. The seismic dataset may be different than the first training data 228 and/or the second training data 230 in some embodiments. More specifically, the seismic dataset may different than a seismic dataset used to train the random noise attenuator 212 (e.g., used to train the first and/or second model), such as a seismic dataset associated with the clean data sample 236 and/or the random noise sample 234. Moreover, the seismic dataset may include data from a same or different seismic survey as the seismic dataset used to train the random noise attenuator 212. To that end, the seismic dataset may correspond to a same or different subsurface formation, geography, and/or the like as the seismic dataset used to train the random noise attenuator 212. As an illustrative example, seismic data associated with a field in the Arctic may be used to train the random noise attenuator 212, and the random noise attenuator 212 may then be used to denoise a seismic dataset associated with a field in New Zealand. In some embodiments, the seismic dataset may be obtained via an input device coupled to the system 200. For instance, the seismic dataset may be received at the system 200 via the computer system 140 and/or a tool included in the drilling system 100, such as a seismic receiver (e.g., a geophone or hydrophone). The seismic dataset may additionally or alternatively be retrieved from a memory or storage device, such as memory 210 or database 224. The seismic dataset may correspond to (e.g., include data associated with) a subsurface reservoir formation. To that end, the seismic dataset may include seismic data representative of the subsurface reservoir formation. In particular, the seismic dataset may include one-dimensional (1D) or multi-dimensional seismic data corresponding to the subsurface reservoir formation. The seismic dataset may further include data obtained with a single shot gather or multiple and/or parallel shot gathers. Further, the seismic dataset may include a quantity of random noise, which may distort (e.g., corrupt) the seismic data. To that end, the random noise may be different than the seismic data, as illustrated in FIG. 6.

Figure 6:
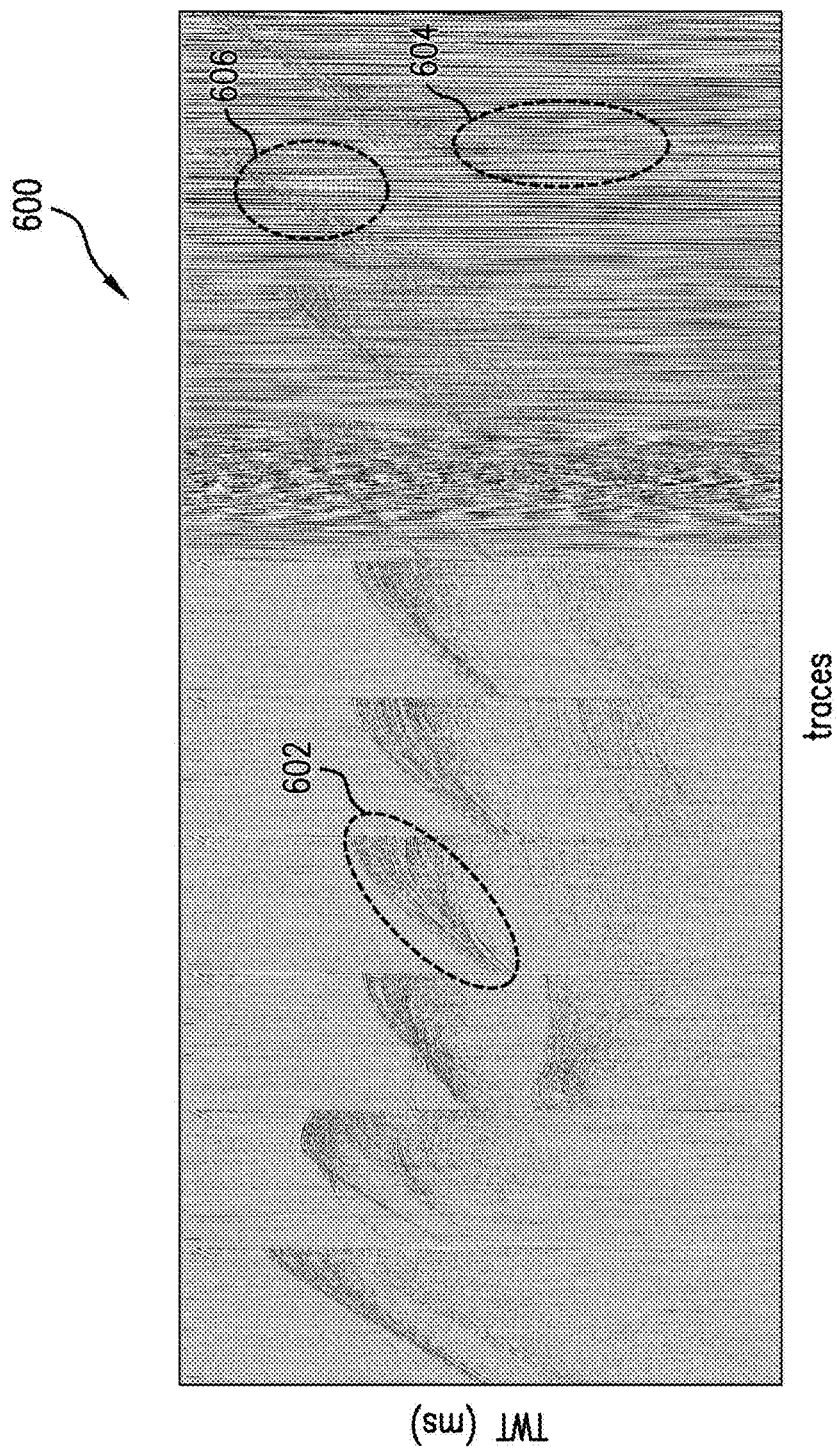
FIG. 6 is a plot of a seismic dataset, in accordance with embodiments of the present disclosure.

FIG. 6 is a plot 600 of an illustrative seismic dataset corresponding to a subsurface reservoir formation. In that regard, the illustrated seismic dataset may be representative of a seismic dataset obtained at block 306 of FIG. 3. As illustrated, different traces of the seismic dataset are plotted next to one another along the horizontal axis (e.g., x-axis) of the plot 600, and the respective two-way travel time (TWT) in of the different traces is plotted along the vertical axis (e.g., y-axis) of the plot 600 in milliseconds (ms). While the data of the plot 600 is shown in grayscale, any suitable color-coding or data visualization may be used to present seismic data. To that end, the illustrated plot 600 is intended to be exemplary and not limiting.

The plot 600 of the seismic dataset includes data corresponding to (e.g., measured in associated with) a subsurface reservoir formation. In the illustrated embodiment, the data is shown as having a sloped and/or curved shape. For instance, the region 602 includes a number of sloped and/or curved lines representative of seismic data. In contrast, random noise is shown in the plot 600 of the seismic dataset as substantially vertical lines. For instance, the region 604 includes vertical lines having different intensities (e.g., as illustrated by different grayscale colors), which are representative of random noise. Further, as shown in the region 606, the random noise may interfere with and/or distort data of the seismic dataset. For instance, in the region 606, the vertical lines corresponding to random noise intersect the sloped and/or curved lines corresponding to seismic data. In that regard, the data included in the region 606 is not as clear and/or readily interpreted as data with lower levels of random noise, such as the data included in the region 602.

Turning back now to FIG. 3, at block 308, the process 300 involves extracting, using the trained first model, random noise from the seismic dataset obtained at block 306. In some embodiments, for example, the seismic dataset may be input to the trained first model, and the trained first model may extract and output random noise from the seismic dataset. An example of random noise that may be extracted and output by the first model is illustrated in FIG. 7.

Figure 7:
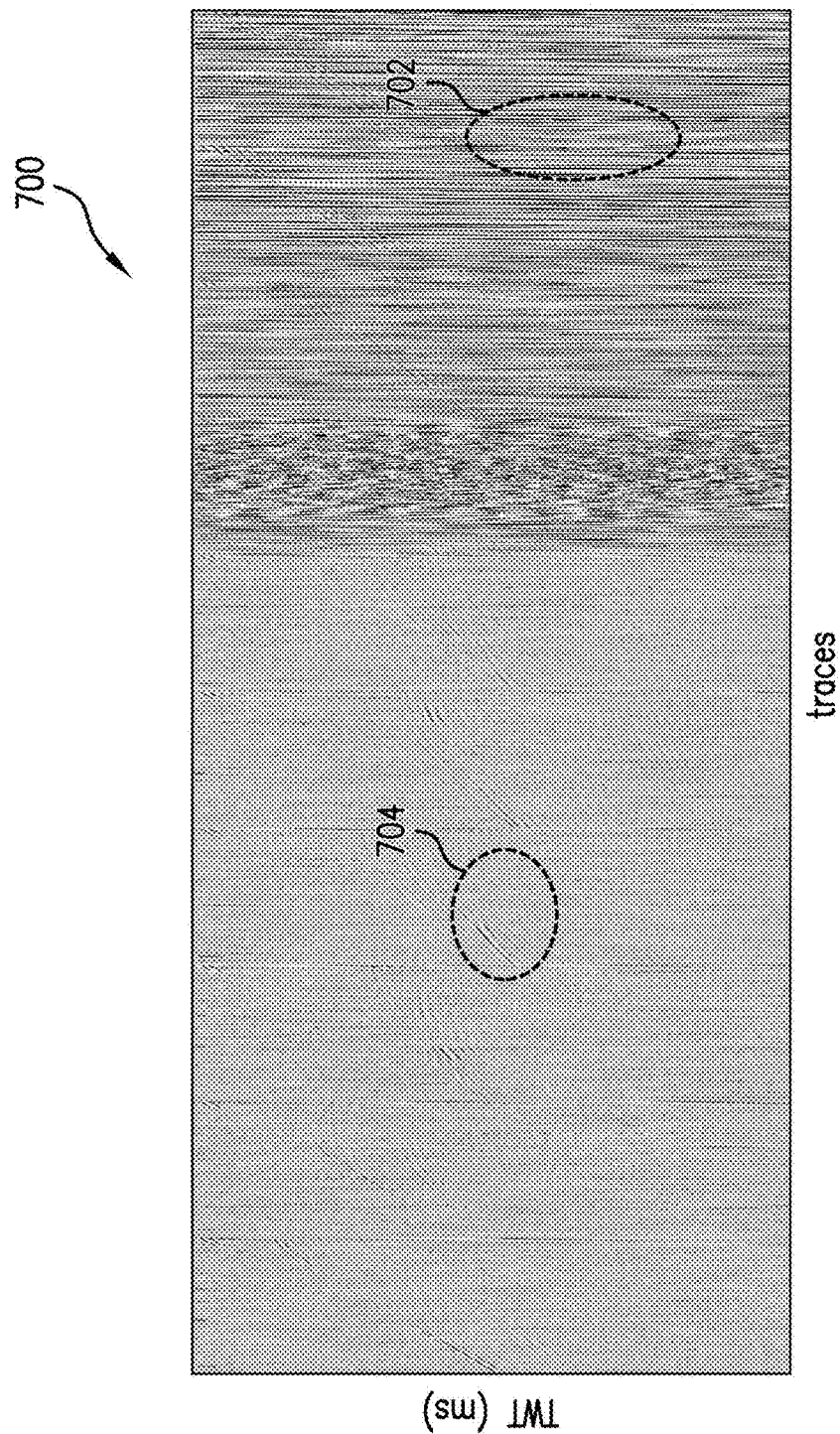
FIG. 7 is a plot of random noise extracted from the seismic dataset, in accordance with embodiments of the present disclosure.

FIG. 7 illustrates an exemplary plot 700 of extracted random noise. As illustrated, portions of the extracted random noise corresponding to different traces (e.g., traces of a seismic dataset from which the random noise is extracted) are plotted next to one another along the horizontal axis (e.g., x-axis) of the plot 700, and the respective two-way travel time (TWT) with respect to the different traces is plotted along the vertical axis (e.g., y-axis) of the plot 700 in milliseconds (ms). While the data of the plot 700 is shown in grayscale, any suitable color-coding or data visualization may be used to present seismic data. To that end, the illustrated plot 700 is intended to be exemplary and not limiting.

The illustrated extracted random noise may be representative of a seismic dataset obtained at block 308 of FIG. 3. In particular, the plot 700 provides an illustrative example of random noise extracted, using the first model, from the plot 600 of the seismic dataset illustrated in FIG. 6. For instance, the illustrated region 702 corresponds to the random noise included in the region 604 of FIG. 6. As further illustrated, the plot 700 of the extracted random noise includes at least a portion of the seismic data included in the plot 600 of the seismic dataset. In particular, the illustrated region 704 includes sloped and/or curved lines, which may correspond to a portion of the seismic data included in the region 602 of FIG. 6. To that end, the sloped and/or curved lines included in the illustrated region 704 may be representative of a leaked signal (e.g., signal loss) from the seismic dataset plotted in FIG. 6.

With reference now to FIG. 3, at block 310, the process 300 involves reconstructing a leaked signal corresponding to a portion of the seismic dataset included within the random noise extracted in block 308 (e.g., output by the first model). That is, for example, seismic data from the original seismic dataset being processed, which may have leaked into the extracted random noise may be reconstructed. As an illustrative example, the seismic data illustrated (e.g., as sloped and/or curved lines) in the region 704 of the extracted random noise shown in FIG. 7 and corresponding to seismic data illustrated in the region 602 of FIG. 6 may be reconstructed (e.g., recovered) at block 310. In particular, the leaked signal may be reconstructed using the trained second model. For instance, in some embodiments, the extracted random noise output by the first model may be input to the trained second model, and based on the extracted random noise, the trained second model may reconstruct and output the leaked signal. An illustrative example of a reconstructed leaked signal, which may be output by the trained second model, is provided in FIG. 8.

Figure 8:
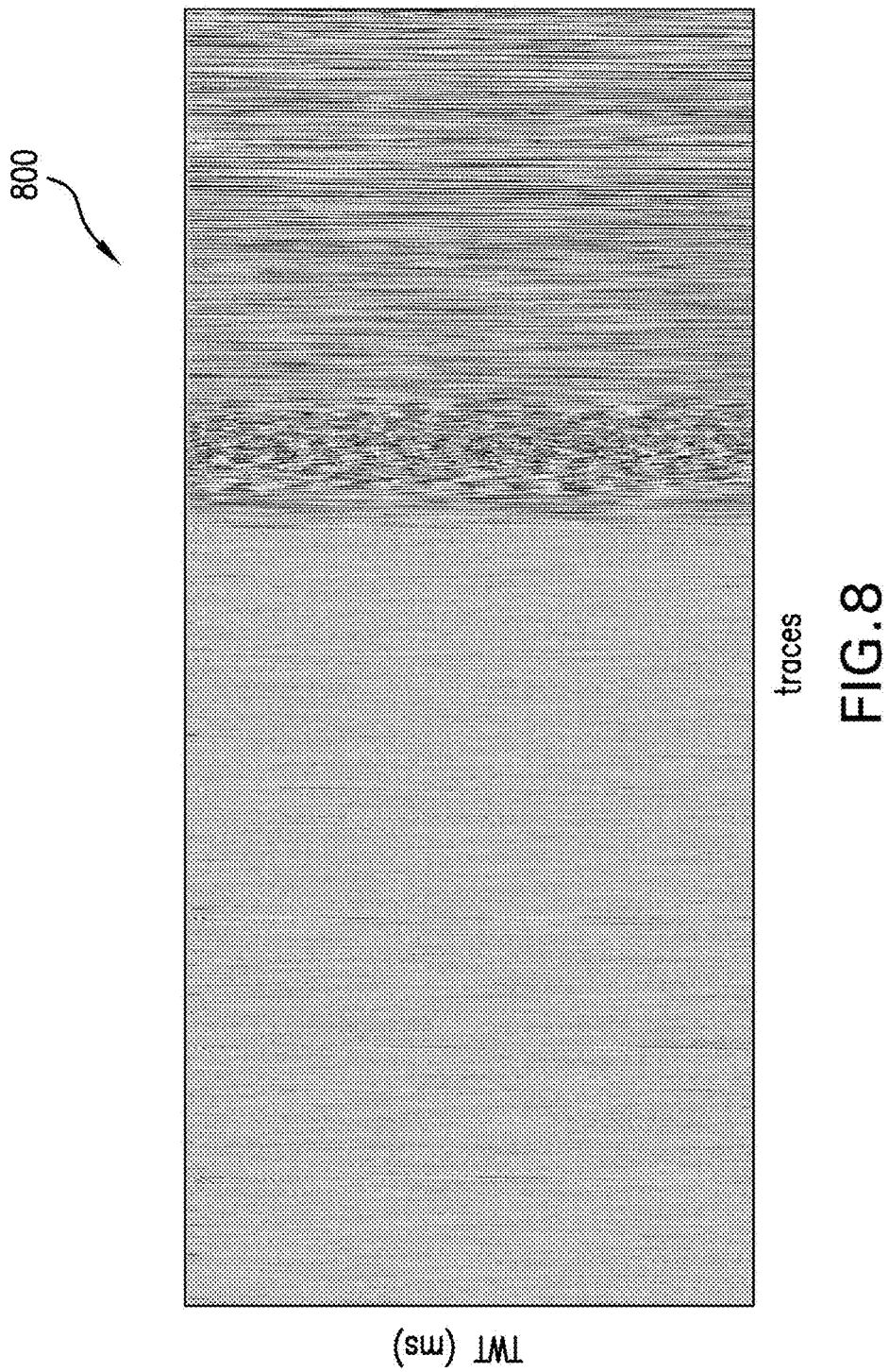
FIG. 8 is a plot of a leaked signal reconstructed from the extracted random noise, in accordance with embodiments of the present disclosure.

FIG. 8 illustrates an exemplary plot 800 of a reconstructed leaked signal. As illustrated, seismic data (e.g., reconstructed seismic data) corresponding to different traces are plotted next to one another along the horizontal axis (e.g., x-axis) of the plot 800, and the respective two-way travel time (TWT) with respect to the different traces is plotted along the vertical axis (e.g., y-axis) of the plot 800 in milliseconds (ms). While the data of the plot 800 is shown in grayscale, any suitable color-coding or data visualization may be used to present seismic data. To that end, the illustrated plot 800 is intended to be exemplary and not limiting.

The illustrated plot 800 of a reconstructed leaked signal may be representative of a leaked signal reconstructed in accordance with block 310 of FIG. 3. In particular, the plot 800 of the reconstructed leaked signal provides an illustrative example of a leaked signal reconstructed using the second model from the plot 700 of the extracted random noise illustrated in FIG. 7. In that regard, the plot 800 may correspond to a plot of signal(s) that may leak (e.g., be removed) from the seismic dataset shown in FIG. 6 with removal (e.g., subtraction) of the extracted random noise of FIG. 7 from the seismic dataset. Thus, as illustrated, the plot 800 is shown as including one or more sloped and/or curved lines, which may correspond to seismic data and differ from random noise.

At block 312, the process 300 of FIG. 3 includes generating a cleaned seismic dataset. In some embodiments, the cleaned seismic dataset may be generated based on the random noise extracted (e.g., using the trained first model) at block 308 and the leaked signal reconstructed (e.g., using the trained second model) at block 310. The cleaned seismic dataset may further be generated based on the seismic dataset obtained at block 306. For instance, in some embodiments, the extracted random noise may be removed (e.g., subtracted) from the seismic dataset, and the reconstructed leaked signal may be combined with (e.g., added to) the seismic dataset to generate the cleaned seismic dataset. In that regard, removing the extracted random noise from the seismic dataset may reduce a level (e.g., quantity) of random noise in the cleaned seismic dataset with respect to the seismic dataset. Removing the extracted random noise may also cause signal loss and/or leakage of seismic data included in the extracted random noise, such as the seismic data included in the region 704 (FIG. 7) of the plot 700 of extracted random noise. Accordingly, combining the reconstructed leaked signal with the seismic dataset may mitigate (e.g., limit) the level of signal loss between the seismic dataset and the cleaned seismic dataset. That is, for example, the combination of the reconstructed leaked signal with the seismic dataset may at least partially offset the level of signal leakage resulting from the removal of the extracted random noise, as the reconstructed leaked signal is recovered from the extracted random noise (e.g., by the second model).

At block 314, the process 300 involves outputting the cleaned seismic dataset. In some embodiments, the cleaned seismic dataset may be output to a display (e.g., an electronic display), such as a monitor. Moreover, as described above, the cleaned seismic dataset may be output at the GUI 214 and/or via the data visualizer 218 of the system 200. In that regard, any suitable visual representation of the cleaned seismic dataset may be provided to the user 240. An illustrative example of a visual representation of the cleaned seismic dataset is shown in FIG. 9.

Figure 9:
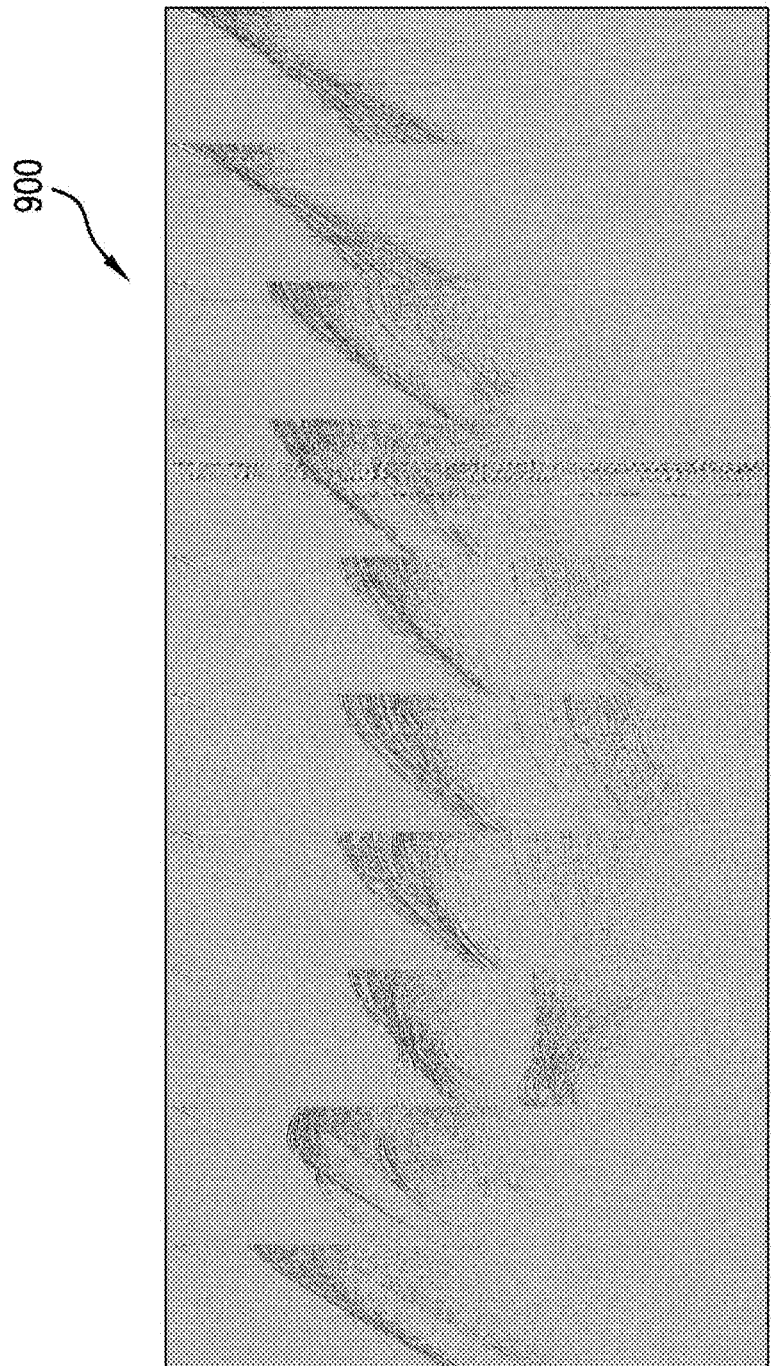
FIG. 9 is a plot of a cleaned seismic dataset, in accordance with embodiments of the present disclosure.

FIG. 9 illustrates an exemplary plot 900 of a cleaned seismic dataset. In particular, the plot 900 of the cleaned seismic dataset may be representative of a cleaned seismic dataset that may be produced by the random noise attenuator 212 based on the plot 600 of a seismic dataset illustrated in FIG. 6. As illustrated, different traces of the cleaned seismic dataset are plotted next to one another along the horizontal axis (e.g., x-axis) of the plot 900, and the respective two-way travel time (TWT) with respect to the different traces is plotted along the vertical axis (e.g., y-axis) of the plot 900 in milliseconds (ms). While the data of the plot 900 is shown in grayscale, any suitable color-coding or data visualization may be used to present seismic data. To that end, the illustrated plot 900 is intended to be exemplary and not limiting.

In comparison with the plot 600, the plot 900 includes fewer vertical lines. In that regard, a level (e.g., quantity) of random noise in the cleaned seismic dataset represented by the plot 900 is lower than the level of random noise in the seismic dataset represented by the plot 600. In further comparison with the plot 600, the plot 900 includes a relatively similar signal strength for the seismic data. More specifically, both the plot 600 and the plot 900 include sloped and/or curved lines representative of the seismic data shown in the region 704 of FIG. 7. In that regard, the data corresponding to the region 704 is maintained and not lost (e.g., leaked) from the seismic dataset of FIG. 6 to the cleaned seismic dataset of FIG. 9 after random noise attenuation (e.g., denoising) of the seismic dataset to produce the cleaned seismic dataset in accordance with the process 300 of FIG. 3.

FIG. 10 is a block diagram of an illustrative computer system 1000 in which embodiments of the present disclosure may be implemented. For example, the functions, components, and/or operations of the system 200 of FIG. 2, process 300 of FIG. 3, process 400 of FIG. 4, and/or process 500 of FIG. 5, as described above, may be implemented using system 1000. System 1000 can be a computer, phone, PDA, or any other type of electronic device. Such an electronic device includes various types of computer readable media and interfaces for various other types of computer readable media. As shown in FIG. 10, system 1000 includes a permanent storage device 1002, a system memory 1004, an output device interface 1006, a system communications bus 1008, a read-only memory (ROM) 1010, processing unit(s) 1012, an input device interface 1014, and a network interface 1016.

Bus 1008 collectively represents all system, peripheral, and chipset buses that communicatively connect the numerous internal devices of system 1000. For instance, bus 1008 communicatively connects processing unit(s) 1012 with ROM 1010, system memory 1004, and permanent storage device 1002.

From these various memory units, processing unit(s) 1012 retrieves instructions to execute and data to process in order to execute the processes of the subject disclosure. The processing unit(s) can be a single processor or a multi-core processor in different implementations.

ROM 1010 stores static data and instructions that are needed by processing unit(s) 1012 and other modules of system 1000. Permanent storage device 1002, on the other hand, is a read-and-write memory device. This device is a non-volatile memory unit that stores instructions and data even when system 1000 is off. Some implementations of the subject disclosure use a mass-storage device (such as a magnetic or optical disk and its corresponding disk drive) as permanent storage device 1002.

Other implementations use a removable storage device (such as a floppy disk, flash drive, and its corresponding disk drive) as permanent storage device 1002. Like permanent storage device 1002, system memory 1004 is a read-and-write memory device. However, unlike storage device 1002, system memory 1004 is a volatile read-and-write memory, such as a random-access memory. System memory 1004 stores some of the instructions and data that the processor needs at runtime. In some implementations, the processes of the subject disclosure are stored in system memory 1004, permanent storage device 1002, and/or ROM 1010. For example, the various memory units include instructions for implementing the deep learning model, for training the deep learning model, and/or for performing automatic digital segmentation of a reservoir rock sample in accordance with embodiments of the present disclosure, e.g., according to the random noise attenuator 212 of FIG. 3, process 400 of FIG. 4, and the process illustrated in FIG. 5, as described above. From these various memory units, processing unit(s) 1012 retrieves instructions to execute and data to process in order to execute the processes of some implementations.

Bus 1008 also connects to input and output device interfaces 1014 and 1006. Input device interface 1014 enables the user to communicate information and select commands to the system 1000. Input devices used with input device interface 1014 include, for example, alphanumeric, QWERTY, or T9 keyboards, microphones, and pointing devices (also called "cursor control devices"). Output device interfaces 706 enables, for example, the display of images generated by the system 1000. Output devices used with output device interface 1006 include, for example, printers and display devices, such as cathode ray tubes (CRT) or liquid crystal displays (LCD). Some implementations include devices such as a touchscreen that functions as both input and output devices. It should be appreciated that embodiments of the present disclosure may be implemented using a computer including any of various types of input and output devices for enabling interaction with a user. Such interaction may include feedback to or from the user in different forms of sensory feedback including, but not limited to, visual feedback, auditory feedback, or tactile feedback. Further, input from the user can be received in any form including, but not limited to, acoustic, speech, or tactile input. Additionally, interaction with the user may include transmitting and receiving different types of information, e.g., in the form of documents, to and from the user via the above-described interfaces.

Also, as shown in FIG. 10, bus 1008 also couples system 1000 to a public or private network (not shown) or combination of networks through a network interface 1016. Such a network may include, for example, a local area network ("LAN"), such as an Intranet, or a wide area network ("WAN"), such as the Internet. Any or all components of system 1000 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself. Accordingly, process 300 of FIG. 3, process 400 of FIG. 4, and/or process 500 of FIG. 5, may be implemented using system 1000 or any computer system having processing circuitry or a computer program product including instructions stored therein, which, when executed by at least one processor, causes the processor to perform functions relating to these methods. Moreover, one or more components of the system 200 of FIG. 2 may be implemented using the system 1000 or another suitable computer system.

As used in this specification and any claims of this application, the terms "computer", "server", "processor", and "memory" all refer to electronic or other technological devices. These terms exclude people or groups of people. As used herein, the terms "computer readable medium" and "computer readable media" refer generally to tangible, physical, and non-transitory electronic storage mediums that store information in a form that is readable by a computer.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., a web page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Furthermore, the exemplary methodologies described herein may be implemented by a system including processing circuitry or a computer program product including instructions which, when executed by at least one processor, causes the processor to perform any of the methodology described herein.

Embodiments of the present disclosure are particularly useful for attenuating random noise from seismic data obtained for a subsurface reservoir formation. As described above, a computer-implemented method of attenuating random noise from seismic data may include: training, based on a random noise library, a first model to extract random noises from seismic datasets, wherein the random noise library comprises a plurality of different noise profiles;

training a second model to reconstruct leaked signals from the random noises extracted by the first model; obtaining a first seismic dataset corresponding to a first subsurface reservoir formation, wherein the first seismic dataset includes random noise; extracting, using the trained first model, at least a portion of the random noise from the first seismic dataset; reconstructing, using the trained second model, a leaked signal corresponding to a portion of the first seismic dataset included within the portion of random noise extracted by the trained first model; generating a cleaned seismic dataset, based on the first seismic dataset, the portion of random noise extracted from the first seismic dataset, and the leaked signal, wherein the cleaned seismic dataset includes a quantity of random noise that is less than that included in the first seismic dataset; and outputting, to a display, the cleaned seismic dataset.

Also described is a computer-readable storage medium with instructions stored therein, where the instructions, when executed by a computer, cause the computer to perform a plurality of functions, including functions to: train, based on a random noise library, a first model to extract random noises from seismic datasets, wherein the random noise library comprises a plurality of different noise profiles; train a second model to reconstruct leaked signals from the random noises extracted by the first model; obtain a first seismic dataset corresponding to a first subsurface reservoir formation, wherein the first seismic dataset includes random noise; extract, using the trained first model, at least a portion of the random noise from the first seismic dataset; reconstruct, using the trained second model, a leaked signal corresponding to a portion of the first seismic dataset included within the portion of random noise extracted by the trained first model; generate a cleaned seismic dataset, based on the first seismic dataset, the portion of random noise extracted from the first seismic dataset, and the leaked signal, wherein the cleaned seismic dataset includes a quantity of random noise that is less than that included in the first seismic dataset; and output, to a display in communication with the processor, the cleaned seismic dataset.

In some of the foregoing embodiments of the method and computer-readable storage medium, the first model may comprise a generative adversarial network (GAN) network, the GAN network may comprise a signal discriminator and a noise discriminator, the first seismic dataset may correspond to a single shot gather, the first seismic dataset may comprise at least one of a one-dimensional seismic dataset or a multi-dimensional seismic dataset, the random noise may comprise swell noise, and generating the cleaned seismic dataset may include: removing the extracted portion of random noise from the first seismic dataset, where removing the portion of random noise from the first seismic dataset also removes the portion of the first seismic dataset corresponding to the leaked signal; and combining the leaked signal with a remaining portion of the first seismic dataset after the portion of random noise is removed such that the cleaned seismic dataset includes the removed portion and the remaining portion of the first seismic dataset. Further, such embodiments may include any one of the following functions, operations or elements, alone or in combination with each other: generating the random noise library, based on a random noise sample associated with a second seismic dataset corresponding to a second subsurface reservoir formation; weighting the random noise sample to generate a first noise profile of the plurality of different noise profiles; combining the random noise sample with an additional random noise sample to generate a second noise profile of the plurality of different noise profiles; and training the first model based on a clean data sample of additional seismic data, wherein the clean data sample lacks random noise, wherein training the first model based on the clean data sample may include weighting the clean data sample, combining the weighted clean data sample with random noise of random noise library to produce an additional data sample, and training the first model based on the additional data sample.

Likewise, a system including a processor and a memory coupled to the processor that has instructions stored therein, which, when executed by the processor, cause the processor to perform functions, including functions to: train, based on a random noise library, a first model to extract random noises from seismic datasets, wherein the random noise library comprises a plurality of different noise profiles; train a second model to reconstruct leaked signals from the random noises extracted by the first model; obtain a first seismic dataset corresponding to a first subsurface reservoir formation, wherein the first seismic dataset includes random noise; extract, using the trained first model, at least a portion of the random noise from the first seismic dataset; reconstruct, using the trained second model, a leaked signal corresponding to a portion of the first seismic dataset included within the portion of random noise extracted by the trained first model; generate a cleaned seismic dataset, based on the first seismic dataset, the portion of random noise extracted from the first seismic dataset, and the leaked signal, wherein the cleaned seismic dataset includes a quantity of random noise that is less than that included in the first seismic dataset; and output, to a display in communication with the processor, the cleaned seismic dataset.

In some of the foregoing embodiments of the system, the first model may comprise a generative adversarial network (GAN) network, the GAN network may comprise a signal discriminator and a noise discriminator, the first seismic dataset may correspond to a single shot gather, the first seismic dataset may comprise at least one of a one-dimensional seismic dataset or a multi-dimensional seismic dataset, and the random noise may comprise swell noise. Further, the functions performed by the processor may further include, either alone or in combination with each other, function to: remove the extracted portion of random noise from the first seismic dataset, wherein removing the portion of random noise from the first seismic dataset also removes the portion of the first seismic dataset corresponding to the leaked signal; combine the leaked signal with a remaining portion of the first seismic dataset after the portion of random noise is removed such that the cleaned seismic dataset includes the removed portion and the remaining portion of the first seismic dataset; generate the random noise library, based on a random noise sample associated with a second seismic dataset corresponding to a second subsurface reservoir formation; weight the random noise sample to generate a first noise profile of the plurality of different noise profiles; combine the random noise sample with an additional random noise sample to generate a second noise profile of the plurality of different noise profiles; train the first model further based on a clean data sample of additional seismic data, wherein the clean data sample lacks random noise; weight the clean data sample; combine the weighted clean data sample with random noise of random noise library to produce an additional data sample; and train the first model based on the additional data sample.

While specific details about the above embodiments have been described, the above hardware and software descriptions are intended merely as example embodiments and are not intended to limit the structure or implementation of the disclosed embodiments. For instance, although many other internal components of the system 1000 are not shown, those of ordinary skill in the art will appreciate that such components and their interconnection are well known.

In addition, certain aspects of the disclosed embodiments, as outlined above, may be embodied in software that is executed using one or more processing units/components. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives, optical or magnetic disks, and the like, which may provide storage at any time for the software programming.

Additionally, the flowchart and block diagrams in the figures illustrate the architecture, functionality, and operation of possible implementations of systems, methods and computer program products according to various embodiments of the present disclosure. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The above specific example embodiments are not intended to limit the scope of the claims. The example embodiments may be modified by including, excluding, or combining one or more features or functions described in the disclosure.

As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the embodiments in the form disclosed. Many modifications and variations will be apparent to those of ordinary skill in the art without departing from the scope and spirit of the disclosure. The illustrative embodiments described herein are provided to explain the principles of the disclosure and the practical application thereof, and to enable others of ordinary skill in the art to understand that the disclosed embodiments may be modified as desired for a particular implementation or use. The scope of the claims is intended to broadly cover the disclosed embodiments and any such modification.

What is claimed is:

1. A computer-implemented method of attenuating random noise from seismic data, comprising:
    training, based on a random noise library and on a clean data sample of additional seismic data, a first model to extract random noise from seismic datasets, wherein the random noise library comprises a plurality of different noise profiles, wherein the clean data sample lacks random noise;
    training a second model to reconstruct signals leaked into the random noise extracted by the first model;
    obtaining a first seismic dataset corresponding to a first subsurface reservoir formation, wherein the first seismic dataset includes random noise;
    extracting, using the trained first model, at least a portion of the random noise from the first seismic dataset, wherein the portion of the random noise includes a signal corresponding to a portion of the first seismic dataset;
    reconstructing, using the trained second model, the signal corresponding to the portion of the first seismic dataset included with the portion of the random noise extracted by the trained first model;
    generating a cleaned seismic dataset based on the first seismic dataset and the signal reconstructed from the portion of the random noise extracted from the first seismic dataset and based on excluding the portion of the random noise extracted from the first seismic dataset, wherein the cleaned seismic dataset includes a quantity of random noise that is less than that included in the first seismic dataset;
    outputting, to a display, the cleaned seismic dataset; and
    performing one or more downhole operations comprising at least one of a drilling operation, a well completion operation, or an injection stimulation operation for recovering hydrocarbons in the first subsurface reservoir formation based on the cleaned seismic dataset.

2. The computer-implemented method of claim 1, wherein generating the cleaned seismic dataset comprises:
    removing the extracted portion of the random noise from the first seismic dataset, wherein removing the portion of the random noise from the first seismic dataset also removes the portion of the first seismic dataset corresponding to the signal; and
    combining the signal with a remaining portion of the first seismic dataset after the portion of the random noise is removed such that the cleaned seismic dataset includes the signal and the remaining portion of the first seismic dataset.

3. The computer-implemented method of claim 1, further comprising:
    generating the random noise library, based on a random noise sample associated with a second seismic dataset corresponding to a second subsurface reservoir formation.

4. The computer-implemented method of claim 3, wherein generating the random noise library comprises at least one of:
    weighting the random noise sample to generate a first noise profile of the plurality of different noise profiles; or
    combining the random noise sample with an additional random noise sample to generate a second noise profile of the plurality of different noise profiles.

5. The computer-implemented method of claim 1, wherein the first model comprises a generative adversarial network (GAN).

6. The computer-implemented method of claim 5, wherein the GAN network comprises a signal discriminator and a noise discriminator.

7. The computer-implemented method of claim 1, wherein training the first model based on the clean data sample comprises:
    weighting the clean data sample;
    combining the weighted clean data sample with random noise of random noise library to produce an additional data sample; and
    training the first model based on the additional data sample.

8. The computer-implemented method of claim 1, wherein the first seismic dataset corresponds to a single shot gather.

9. The computer-implemented method of claim 1, wherein the first seismic dataset comprises at least one of a one-dimensional seismic dataset or a multi-dimensional seismic dataset.

10. The computer-implemented method of claim 1, wherein the random noise comprises swell noise.

11. The computer-implemented method of claim 1, wherein performing one or more downhole operations in the first subsurface reservoir formation based on the cleaned seismic dataset further comprises:

modifying a planned path of a wellbore through the first subsurface reservoir formation.

12. A system comprising:
a processor; and
a memory having processor-readable instructions stored therein, which, when executed by the processor, cause the processor to perform a plurality of functions, including functions to:
train, based on a random noise library and on a clean data sample of additional seismic data, a first model to extract random noise from seismic datasets, wherein the random noise library comprises a plurality of different noise profiles, wherein the clean data sample lacks random noise;
train a second model to reconstruct signals leaked into the random noise extracted by the first model;
obtain a first seismic dataset corresponding to a first subsurface reservoir formation, wherein the first seismic dataset includes random noise;
extract, using the trained first model, at least a portion of the random noise from the first seismic dataset, wherein the portion of the random noise includes a signal corresponding to a portion of the first seismic dataset;
reconstruct, using the trained second model, the signal corresponding to the portion of the first seismic dataset included with the portion of the random noise extracted by the trained first model;
generate a cleaned seismic dataset based on the first seismic dataset and the signal reconstructed from the portion of the random noise extracted from the first seismic dataset and based on excluding the portion of the random noise extracted from the first seismic dataset, wherein the cleaned seismic dataset includes a quantity of random noise that is less than that included in the first seismic dataset;
output, to a display in communication with the processor, the cleaned seismic dataset; and
perform one or more downhole operations comprising at least one of a drilling operation, a well completion operation, or an injection stimulation operation for recovering hydrocarbons in the first subsurface reservoir formation based on the cleaned seismic dataset.

13. The system of claim 12, wherein the plurality of functions performed by the processor further includes functions to:
remove the extracted portion of the random noise from the first seismic dataset, wherein removing the portion of the random noise from the first seismic dataset also removes the portion of the first seismic dataset corresponding to the signal; and
combine the signal with a remaining portion of the first seismic dataset after the portion of the random noise is removed such that the cleaned seismic dataset includes the signal and the remaining portion of the first seismic dataset.

14. The system of claim 12, wherein the plurality of functions further includes functions to:
generate the random noise library, based on a random noise sample associated with a second seismic dataset corresponding to a second subsurface reservoir formation.

15. The system of claim 14, wherein the plurality of functions further includes functions to:
weight the random noise sample to generate a first noise profile of the plurality of different noise profiles; and
combine the random noise sample with an additional random noise sample to generate a second noise profile of the plurality of different noise profiles.

16. The system of claim 12, wherein the first model comprises a generative adversarial network (GAN).

17. The system of claim 16, wherein the GAN network comprises a signal discriminator and a noise discriminator.

18. The system of claim 12, wherein the plurality of functions further includes functions to:
weight the clean data sample;
combine the weighted clean data sample with random noise of random noise library to produce an additional data sample; and
train the first model based on the additional data sample.

19. A non-transitory computer-readable storage medium comprising computer-readable instructions stored therein, which, when executed by a computer, cause the computer to perform a plurality of functions, including functions to:
train, based on a random noise library and on a clean data sample of additional seismic data, a first model to extract random noise from seismic datasets, wherein the random noise library comprises a plurality of different noise profiles, wherein the clean data sample lacks random noise;
train a second model to reconstruct signals leaked into the random noise extracted by the first model;
obtain a first seismic dataset corresponding to a first subsurface reservoir formation, wherein the first seismic dataset includes random noise;
extract, using the trained first model, at least a portion of the random noise from the first seismic dataset, wherein the portion of the random noise includes a signal corresponding to a portion of the first seismic dataset;
reconstruct, using the trained second model, the signal corresponding to the portion of the first seismic dataset included with the portion of the random noise extracted by the trained first model;
generate a cleaned seismic dataset based on the first seismic dataset and the signal reconstructed from the portion of the random noise extracted from the first seismic dataset and based on excluding the random noise extracted from the first seismic dataset, wherein the cleaned seismic dataset includes a quantity of random noise that is less than that included in the first seismic dataset;
output, to a display in communication with the computer, the cleaned seismic dataset; and
perform one or more downhole operations comprising at least one of a drilling operation, a well completion operation, or an injection stimulation operation for recovering hydrocarbons in the first subsurface reservoir formation based on the cleaned seismic dataset.

20. The non-transitory computer-readable storage medium of claim 19, wherein the plurality of functions performed by the computer further includes functions to:
remove the extracted portion of the random noise from the first seismic dataset, wherein removing the portion of the random noise from the first seismic dataset also removes the portion of the first seismic dataset corresponding to the signal; and
combine the signal with a remaining portion of the first seismic dataset after the portion of the random noise is removed such that the cleaned seismic dataset includes the signal and the remaining portion of the first seismic dataset.

* * * * *